(12) United States Patent
Ohtsuji

(10) Patent No.: US 11,418,268 B2
(45) Date of Patent: Aug. 16, 2022

(54) TRANSMISSION DEVICE IDENTIFICATION SYSTEM, RADIO WAVE SENSOR DEVICE, IDENTIFYING PROCESSING DEVICE, AND PROCESSING METHOD

(71) Applicant: NEC Corporation, Tokyo (JP)

(72) Inventor: Taichi Ohtsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/973,589

(22) PCT Filed: Jun. 12, 2019

(86) PCT No.: PCT/JP2019/023205
§ 371 (c)(1),
(2) Date: Dec. 9, 2020

(87) PCT Pub. No.: WO2019/240152
PCT Pub. Date: Dec. 19, 2019

(65) Prior Publication Data
US 2021/0258081 A1    Aug. 19, 2021

(30) Foreign Application Priority Data

Jun. 12, 2018  (JP) .............................. JP2018-112197

(51) Int. Cl.
*H04B 15/00* (2006.01)
*H04B 17/20* (2015.01)

(52) U.S. Cl.
CPC .................................... *H04B 15/00* (2013.01)

(58) Field of Classification Search
CPC .......... H04B 1/1027; H04B 1/12; H04B 1/16; H04B 1/40; H04B 7/00; H04B 15/00; H04B 15/02; H04B 15/005; H04B 17/20; H04B 17/26; H04L 5/0048; H04L 5/005;
(Continued)

(56) References Cited

U.S. PATENT DOCUMENTS

| 8,437,703 B2 * | 5/2013 | Maeda ................. H04B 17/309 455/69 |
| 9,385,894 B2 * | 7/2016 | Ogata ...................... H04B 1/16 |
| 10,701,732 B2 * | 6/2020 | Son ....................... H04W 84/12 |

(Continued)

FOREIGN PATENT DOCUMENTS

| JP | 2012-184984 A | 9/2012 |
| JP | 2012184984 A | * 9/2012 |

(Continued)

OTHER PUBLICATIONS

International Search Report for PCT Application No. PCT/JP2019/023205, dated Aug. 27, 2019.

*Primary Examiner* — Quochien B Vuong

(57) ABSTRACT

A transmission device identification system includes: one or more reception units; a feature output unit that outputs, for each of the one or more reception units, a feature of a reception signal of the reception unit, the feature being corrected based on a receiver characteristic of the reception unit; and an identification unit that identifies a transmission device that is a radio wave transmitting source based on the feature and a transmission radio wave feature, the transmission radio wave feature indicating a feature of a transmission radio wave for each transmission device.

20 Claims, 21 Drawing Sheets

(58) Field of Classification Search
CPC ..... H04L 17/27; H04L 17/309; H04L 17/318; H04L 67/18
See application file for complete search history.

(56) References Cited

U.S. PATENT DOCUMENTS

| | | | |
|---|---|---|---|
| 11,075,703 B2* | 7/2021 | Kim | ........................ H04B 17/26 |
| 2009/0225901 A1 | 9/2009 | Shimamura et al. | |
| 2017/0245116 A1* | 8/2017 | Chu | ..................... H04B 17/318 |
| 2021/0167873 A1* | 6/2021 | Lerosey | ................. H04B 17/27 |

FOREIGN PATENT DOCUMENTS

| | | |
|---|---|---|
| JP | 2014-082610 A | 5/2014 |
| JP | 2016-040871 A | 3/2016 |
| WO | 2008/038388 A1 | 4/2008 |

* cited by examiner

TRANSMISSION DEVICE IDENTIFICATION SYSTEM, RADIO WAVE SENSOR DEVICE, IDENTIFYING PROCESSING DEVICE, AND PROCESSING METHOD

This application is a National Stage Entry of PCT/JP2019/023205 filed on Jun. 12, 2019, which claims priority from Japanese Patent Application 2018-112197 filed on Jun. 12, 2018, the contents of all of which are incorporated herein by reference, in their entirety.

TECHNICAL FIELD

The present invention relates to a transmission device identification system, a radio wave sensor device, an identifying processing device, and a processing method.

BACKGROUND ART

A technique for identifying a transmission device that is a radio wave transmitting source has been proposed.

For example, Patent Document 1 describes a radio wave identification system that reduces the influence of multipath phasing when identifying an individual of a radio wave transmitting source. This radio wave identification system stores dictionary data indicating waveforms of known signals such as pilot signals in advance for each transmission device. Then, this radio wave identification system estimates the transmission coefficient of the propagation path using the waveform of a known signal extracted from the reception signal and the waveform of a known signal in the dictionary data. Further, this radio wave identification system equalizes the reception signal based on the estimated transmission coefficient, evaluates the correlation between the equalized reception signal and the dictionary data, and identifies the transmission device that transmitted the reception signal.

PRIOR ART DOCUMENTS

Patent Document

[Patent Document 1] Japanese Unexamined Patent Application, First Publication No. 2016-40871

SUMMARY OF THE INVENTION

Problem to be Solved by the Invention

As factors affecting the accuracy of identifying the transmission device of the radio wave transmitting source, not only factors of the radio wave propagation path such as multipath fading but also factors of the device that receives the radio waves can excise an effect. In order to improve the accuracy of identifying a transmission device that is a radio wave transmitting source, it is preferable that the device receiving the radio waves be able reduce the influence of the factor.

An example object of the present invention is to provide a transmission device identification system, a radio wave sensor device, an identifying processing device, and a processing method capable of solving the above-mentioned problems.

Means for Solving the Problem

According to a first example aspect of the present invention, a transmission device identification system includes: one or more reception units; a feature output unit that outputs, for each of the one or more reception units, a feature of a reception signal of the reception unit, the feature being corrected based on a receiver characteristic of the reception unit; and an identification unit that identifies a transmission device that is a radio wave transmitting source based on the feature and a transmission radio wave feature, the transmission radio wave feature indicating a feature of a transmission radio wave for each transmission device.

According to a second example aspect of the present invention, a radio wave sensor device includes: a reception unit; and a feature output unit that outputs a feature of a reception signal of the reception unit, the feature being corrected based on a receiver characteristic of the reception unit.

According to a third example aspect of the present invention, an identifying processing device includes: a feature correction unit that corrects, for each of one or more reception units, a feature of a reception signal of the reception unit based on a receiver characteristic of the reception unit; and an identification unit that identifies a transmission device that is a radio wave transmitting source based on the corrected feature of the reception signal and a transmission radio wave feature showing a feature of a transmission radio wave for each transmission device.

According to a fourth example aspect of the present invention, a processing method includes: receiving a radio wave by one or more reception units; outputting a feature of a reception signal of the reception unit, the feature being corrected based on a receiver characteristic of the reception unit; and identifying a transmission device that is a radio wave transmitting source based on the feature and a transmission radio wave feature, the transmission radio wave feature indicating a feature of a transmission radio wave for each transmission device.

According to a sixth example aspect of the present invention, a processing method includes: correcting, for each of one or more reception units, a feature of a reception signal of the reception unit based on a receiver characteristic of the reception unit; and identifying a transmission device that is a radio wave transmitting source based on the corrected feature of the reception signal and a transmission radio wave feature, the transmission radio wave feature indicating a feature of a transmission radio wave for each transmission device.

Effect of the Invention

According to an example embodiment of the present invention, it is possible to reduce the influence of a factor of a device that receives a radio wave on identification of a transmission device that is a radio wave transmitting source.

EXAMPLE EMBODIMENTS

Hereinbelow, example embodiments of the present invention will be described, but the following example embodiments do not limit the inventions claimed. Also, not all combinations of features described in the example embodiments may be essential to the means of solving the invention.

First Example Embodiment

Figure 1:
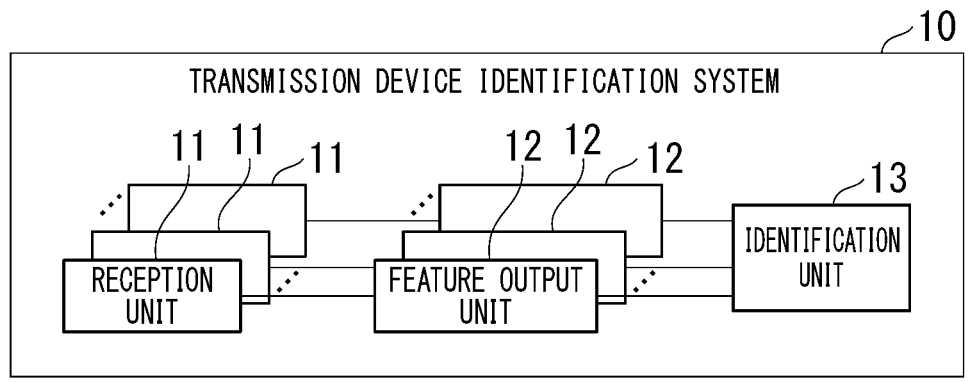
FIG. 1 is a schematic block diagram showing an example of a functional configuration of a transmission device identification system according to a first example embodiment.

FIG. 1 is a schematic block diagram showing an example of the functional configuration of the transmission device identification system according to the first example embodiment. With the configuration shown in FIG. 1, a transmission device identification system 10 includes a reception unit 11, a feature output unit 12, and an identification unit 13.

The transmission device identification system 10 identifies a transmission device based on individual differences in radio waves transmitted by the transmission device (not shown). In addition, "identify" is paraphrased as "discriminate", "determine" and the like. Individual differences occur in the radio waves to be transmitted due to differences in the specifications of the transmission device, or due to variations in the characteristics of analog circuits even if the specifications are the same. For each transmission device, the transmission device identification system 10 stores the feature of the radio wave transmitted by that transmission device. Then, when the transmission device identification system 10 receives the radio wave, it extracts the feature of the reception signal. The transmission device identification system 10 identifies the transmission device of the transmitting source of the received radio wave by comparing the extracted feature with the stored feature.

It is sufficient that the transmission device identification system 10 can extract the feature of the received radio wave, and the transmission device does not need to transmit the radio wave to the transmission device identification system 10.

The transmission device identification system 10 can be applied to various uses such as detection and tracking of suspicious persons in urban areas and various facilities (airports, malls, etc.), or grasping the flow lines of customers in stores and commercial facilities.

Further, the transmission device identification system 10 can determine the identity of a transmission device using the feature of the radio wave, but the owner of the transmission device cannot be directly determined from this feature. In this way, the feature of the radio wave used by the transmission device identification system 10 has anonymity, and the transmission device identification system 10 can perform processing in consideration of personal privacy.

The reception unit 11 receives radio waves from a transmission device that is the target of individual identification. The number of reception units 11 included in the transmission device identification system 10 may be one or more.

Figure 2:
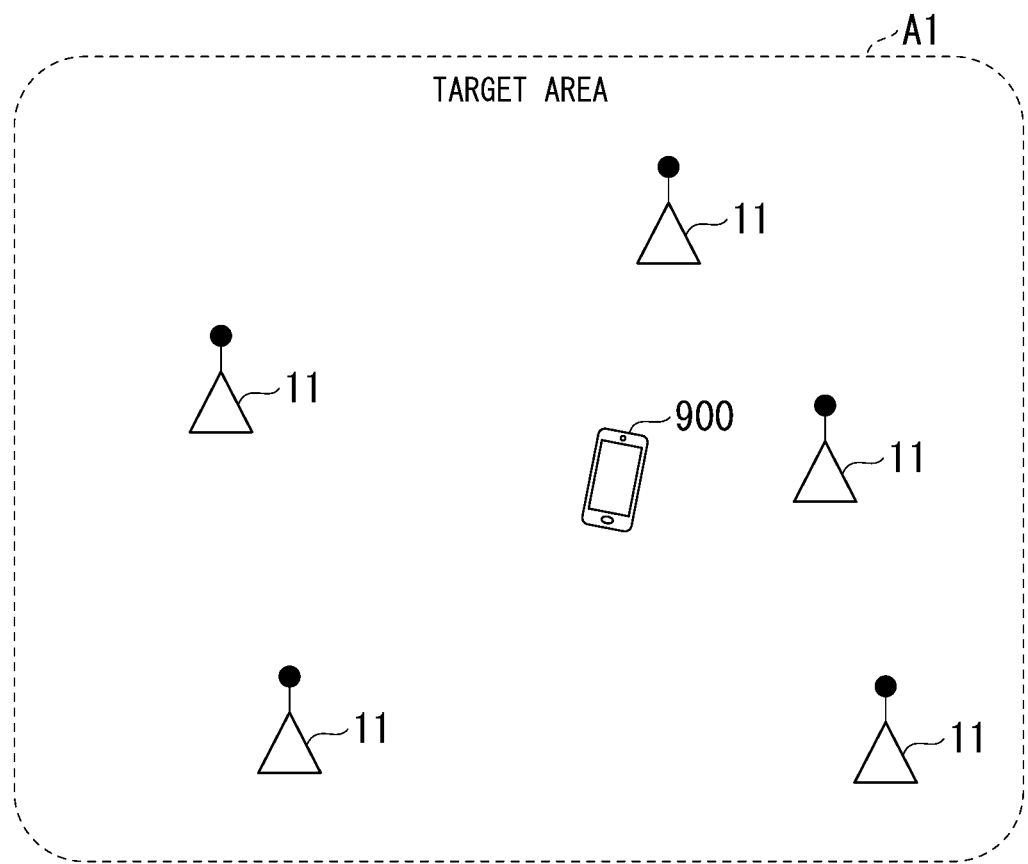
FIG. 2 is a diagram showing an arrangement example of a reception unit according to the first example embodiment.

FIG. 2 is a diagram showing an arrangement example of the reception unit 11.

In the example of FIG. 2, five reception units 11 arranged in the target area A1 for individual identification and a transmission device 900 to be targeted for individual identification are shown.

The transmission device 900 may be a mobile terminal device such as a smartphone or a mobile phone. Further, the transmission device 900 may be an IoT (Internet of Things) terminal, an MTC (Machine Type Communication) terminal, or the like that transmits radio waves. However, the transmission device 900 (the target of individual identification by the transmission device identification system 10) is not limited thereto. Various devices that transmit radio waves can be targeted for individual identification by the transmission device identification system 10.

The radio waves transmitted by the transmission device 900 do not have to be radio waves transmitted to the reception unit 11. For example, the reception unit 11 may receive radio waves transmitted by the transmission device 900 to a mobile communication base station or radio waves transmitted by the transmission device 900 to search for a mobile communication base station.

If the target area A1 is wide, the number of reception units 11 may be increased. As a result, no matter where the transmission device 900 transmits radio waves in the target area A1, any reception unit 11 can be arranged to receive the radio waves.

Further, if three or more reception units 11 receive radio waves transmitted by the transmission device 900, the transmission device identification system 10 can estimate the position of the transmission device 900 based on the received radio wave strength in each of the reception units 11.

When the transmission device identification system 10 includes a plurality of reception units 11, individual differences in receiver characteristics occur for each reception unit 11. Even if the reception units 11 included in the transmission device identification system 10 all have the same specifications, individual differences in receiver characteristics occur for each reception unit 11 due to variations in the characteristics of analog circuits and the like. The feature of the reception signal changes due to individual differences of receiver characteristics appearing in the reception signal. The feature of the reception signal differs depending on which reception unit 11 receives the radio wave. Thereby, there is a possibility of a fall in the accuracy with which the transmission device identification system 10 identifies the transmission device 900.

Further, even when the transmission device identification system 10 includes one reception unit 11, when the reception unit 11 different from that one reception unit 11 included in the transmission device identification system 10 is used during registration of the data serving as a comparison target with the transmission device 900, individual differences in the receiver characteristics of the reception units 11 can affect the identification accuracy of the transmission device 900. Due to the influence of the receiver characteristic of the reception unit 11 on the feature of the reception signal differing between when the data is registered and when the identification of the transmission device 900 is executed, the accuracy with which the transmission device identification system 10 identifies the transmission device 900 may decrease.

Therefore, the transmission device identification system 10 corrects the reception data in order to reduce the reduction in the identification accuracy of the transmission device 900 due to the individual difference of the reception unit 11.

The correction referred to here is a corrective term of data processing (change of data value) that reduces the influence of the receiver characteristic of the reception unit 11 on the comparison between the feature of the reception signal and the feature of the transmission radio wave that has been registered.

The feature output unit 12 is provided for each reception unit 11, and outputs the feature of the reception signal of the reception unit 11 corrected based on the receiver characteristic of the reception unit 11 for each reception unit 11.

There are two methods for acquiring the feature of the reception signal of the reception unit 11 corrected based on the receiver characteristic of the reception unit 11. One method is a method of extracting the feature from the reception signal and correcting the extracted feature. The other method is a method of correcting the reception signal and extracting the feature from the corrected reception signal.

In this way, there are a case in which the feature of the reception signal is the target of correction, and a case in which the reception signal is the target of correction. Even when a correction is performed on any of these targets, the influence of the receiver characteristic of the reception unit 11 on the feature of the reception signal output by the feature output unit 12 is reduced.

On the other hand, instead of acquiring the feature of the reception signal of the reception unit 11 corrected on the basis of a receiver characteristic of the reception unit 11, the transmission radio wave feature that is a comparison target with this may be corrected. The transmission radio wave feature referred to here is data indicating the feature of the transmission radio wave of the transmission device for each transmission device. In this case, the transmission device identification system (a transmission device identification system 20 described later) performs correction to reflect the receiver characteristic of the reception unit 11 in the transmission radio wave feature. In this case, since the receiver characteristic of the reception unit 11 is reflected in both the feature of the reception signal and the feature of the transmission radio wave, when the transmission device identification system 20 compares the feature of the reception signal and the transmission radio wave feature, the influence of the receiver characteristic of the reception unit 11 is offset.

The feature used by the transmission device identification system 10 to identify the transmission device 900 as the radio wave transmitting source can be various features in which individual differences of the transmission device 900 appear. For example, the transmission device identification system 10 may use a feature indicating one or a plurality among the transient (rising and falling), the power spectral density of the preamble portion, the error vector amplitude, the IQ phase (in-phase/orthogonal phase) error, the IQ imbalance amount, the frequency offset and the symbol clock error of the reception signal of the reception unit 11. The types of features are not limited to these examples.

The information necessary for correcting the receiver characteristic is obtained by inputting a specific calibration signal to the reception unit 11 at the time of shipment of the reception unit 11 (for example, a radio wave sensor on which the reception unit 11 is mounted) or when the reception unit 11 is installed, and measuring the amount of deformation (distortion amount) or deviation from the calibration signal. As a generation source of the calibration signal input to the reception unit 11, for example, a device including a high-precision oscillator may be used. Alternatively, as the calibration signal, a downlink signal of a base station of a mobile phone may be used, or a broadcast wave such as for television or radio may be used.

The identification unit 13 acquires the feature of the reception signal of the reception unit 11 corrected by the feature output unit 12 on the basis of the receiver characteristic of the reception unit 11, and identifies the transmission device 900 that is a radio wave transmitting source on the basis of the feature of the reception signal and the transmission radio wave feature. As described above, the transmission radio wave feature referred to here is data indicating the feature of the transmission radio wave of the transmission device 900 for each transmission device 900.

As a method used by the identification unit 13 to identify the transmission device 900 that is the radio wave transmitting source, a method of evaluating the degree of similarity of the feature, a method of causing the transmission device identification system 10 to perform machine learning using the feature, or the like can be adopted.

For example, the identification unit 13 may use one or more of the correlation degree calculation by cos similarity calculation, k-nearest neighbor method, random forest, support vector machine, and multi-layer perceptron to identify the transmission device 900 that is the radio wave transmitting source. The identification method is not limited to these examples.

As described above, the feature output unit 12 outputs the feature of the reception signal of the reception unit 11 corrected based on the receiver characteristic of the reception unit 11 for each reception unit 11. The identification unit 13 identifies the transmission device 900 that is the radio wave transmitting source on the basis of the feature output by the feature output unit 12 and the transmission radio wave feature showing a feature of the transmission radio wave for each transmission device 900.

The identification unit 13 uses the feature of the reception signal of the reception unit 11 corrected on the basis of the receiver characteristic of the reception unit 11, and thereby it is possible to lessen the influence of the receiver characteristic of the reception unit 11 with respect to identification of the transmission device 900 that is the radio wave transmitting source.

According to the transmission device identification system 10, in this respect, it is possible to reduce the influence of a factor of the device receiving radio waves on the identification of the transmission device 900 that is the radio wave transmitting source.

In particular, also when registering a transmission radio wave feature, by making corrections so as to reduce the influence of the receiver characteristic of the reception unit 11, it is possible to reduce the influence of the receiver characteristic of the reception unit 11 on both the feature of the reception signal and the transmission radio wave feature. Thereby, the identification unit 13 can identify the transmission device 900 that is the radio wave transmitting source with higher accuracy.

Further, as described above, as a method used by the identification unit 13 to identify the transmission device 900 that is the radio wave transmitting source, it is possible to adopt a method of evaluating the degree of similarity of the feature or causing the transmission device identification system 10 to perform machine learning using the feature. The identification unit 13 may identify the transmission device that is the radio wave transmitting source by using one or more of the correlation degree calculation by cos similarity calculation, the k-nearest neighbor method, the random forest, the support vector machine, and the multi-layer perceptron.

Thereby, it is possible to select the method used by the identification unit 13 for identification of the transmission device 900 that is the radio wave transmitting source in accordance with factors such as the mounting form and processing capacity of the identification unit 13, the characteristic of the radio wave transmitted by the transmission device 900, and the receiver characteristic of the reception unit 11. In this respect, it is expected that the identification unit 13 can identify the transmission device 900 that is the radio wave transmitting source with high accuracy.

Second Example Embodiment

The second example embodiment shows a first example that further embodies the first example embodiment.

Figure 3:
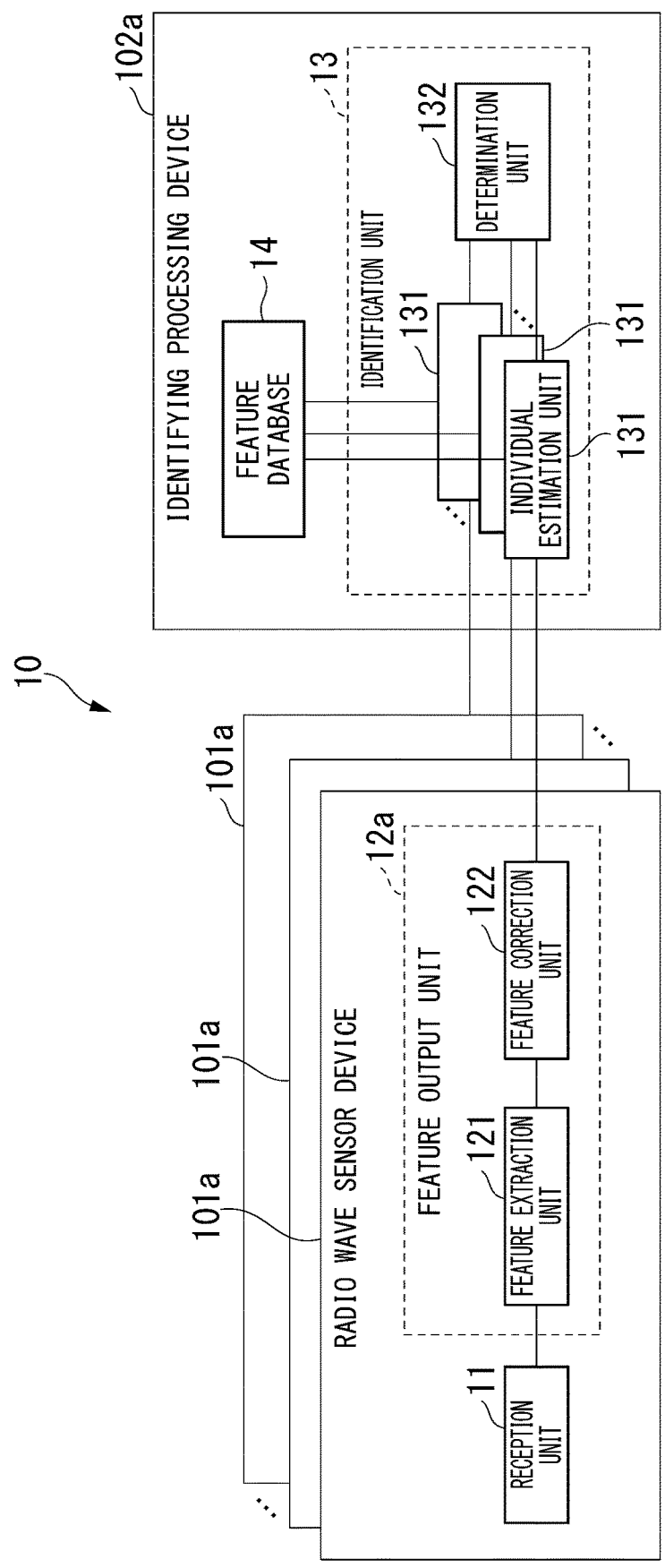
FIG. 3 is a schematic block diagram showing an example of a functional configuration of a transmission device identification system according to a second example embodiment.

FIG. 3 is a schematic block diagram showing an example of the functional configuration of the transmission device identification system according to the second example embodiment. In the configuration shown in FIG. 3, the transmission device identification system 10 includes a radio wave sensor device 101*a* and an identifying processing device 102*a*. The reception unit 11 and a feature output unit 12*a* are mounted on the radio wave sensor device 101*a*. The feature output unit 12*a* includes a feature extraction unit 121 and a feature correction unit 122. The identification unit 13 is mounted on the identifying processing device 102*a*. Further, the identifying processing device 102*a* includes a feature database 14. The identification unit 13 includes an individual estimation unit 131 and a determination unit 132.

The number of radio wave sensor devices 101*a* included in the transmission device identification system 10 may be one or more. One reception unit 11 is mounted for each one radio wave sensor device 101*a*. The feature extraction unit 121, the feature correction unit 122, and the individual estimation unit 131 are provided for each reception unit 11.

The feature extraction unit 121 is provided for each reception unit 11, and extracts the feature of the reception signal of the reception unit 11.

As described above for the transmission device identification system 10, the feature used by the feature extraction unit 121 for identification of the transmission device 900 can be various features in which individual differences of the transmission device 900 appear. For example, the feature extraction unit 121 may use a feature indicating one or a plurality among the transient (rising and falling), power spectral density of the preamble portion, error vector amplitude, IQ phase error, IQ imbalance amount, frequency offset, and symbol clock error of the reception signal of the reception unit 11. The types of features are not limited to these examples.

The feature correction unit 122 corrects the feature of the reception signal of the reception unit 11 based on the receiver characteristic of the reception unit 11.

The receiver characteristic of the reception unit 11 used by the feature correction unit 122 for correction can be various features according to the feature extracted by the feature extraction unit 121 for each reception unit 11. For example, the feature correction unit 122 may use a feature indicating one or a plurality of the transient, the power spectral density of the preamble portion, the error vector amplitude, the IQ phase error, the IQ imbalance amount, the frequency offset, and the symbol clock error of the reception signal of the reception unit 11. The types of features are not limited to these examples.

The feature database 14 stores the transmission radio wave feature. As described above, the transmission radio wave feature is data indicating the transmission radio wave feature of the transmission device 900 for each transmission device 900. Further, the transmission radio wave feature is acquired in advance and is a comparison target with the feature of the reception signal.

However, the identifying processing device 102*a* may acquire the transmission radio wave feature from another device, such as the feature database 14 being configured as a device separate from the identifying processing device 102*a*. Further, the feature database 14 may have an external configuration of the transmission device identification system 10.

The individual estimation unit 131 estimates the transmission device 900 that is the radio wave transmitting source for each reception signal of the reception unit 11. Specifically, the individual estimation unit 131 acquires the feature of the corrected reception signal from the feature correction unit 122 when the reception unit 11 corresponding to the individual estimation unit 131 itself has received a radio wave from the transmission device 900. Then, the individual estimation unit 131 acquires the transmission radio wave feature of each of the plurality of transmission devices 900 registered in the feature database 14. The individual estimation unit 131 compares the feature of the reception signal with the transmission radio wave feature for each transmission device 900, and outputs the comparison result to the determination unit 132.

The individual estimation unit 131 may output, to the determination unit 132, the identification information of the transmission radio wave feature determined to have the highest degree of similarity to the feature of the reception signal. The transmission radio wave feature identification information is identification information for identifying the transmission radio wave feature registered in the feature database 14. For example, a transmission radio wave feature registered in the feature database 14 may be assigned a serial number and used as identification information.

Alternatively, the individual estimation unit 131 may output the degree of similarity between the transmission radio wave feature and the feature of the reception signal calculated for the transmission radio wave feature to the determination unit 132. The individual estimation unit 131 may output the identification information of the transmission radio wave feature having the highest degree of similarity to the determination unit 132. The individual estimation unit 131 may output the degree of similarity together with the identification information. Alternatively, the individual estimation unit 131 may output the identification information of a predetermined number (for example, the top three) of the transmission radio wave features in descending order of degree of similarity and the degree of similarity, to the determination unit 132. Alternatively, the individual estimation unit 131 may output the identification information of the transmission radio wave features and the degrees of similarity to the determination unit 132 for all the transmission devices 900 (all the transmission radio wave features stored in the feature database 14).

The degree of similarity here corresponds to an example of the degree of certainty (ratio) that the transmission device 900 indicated by the transmission radio wave feature is the transmission device 900 that is the radio wave transmitting source.

Instead of the combination of the feature database 14 and the individual estimation unit 131, the identifying processing device 102a may include an identification device that receives the input of the feature of the reception signal and outputs the identification information of the similar transmission radio wave feature.

The determination unit 132 determines which of the transmission devices 900 estimated by the individual estimation unit 131 for each reception signal the transmission device 900 that is a radio wave transmitting source is.

When each of the individual estimation units 131 outputs identification information of the transmission radio wave feature to the determination unit 132, the determination unit 132 may determine the transmission device 900 that is the radio wave transmitting source by a majority vote of the identification information.

When each of the individual estimation units 131 transmits the identification information and the degree of similarity of the transmission radio wave feature to the determination unit 132, the determination unit 132 may weight the identification information by the degree of similarity and take a majority vote. For example, the determination unit 132 may add up the degree of similarity for each identification information, and determine the transmission device 900 identified by the transmission radio wave feature having the largest total value as the transmission device 900 of the radio wave transmitting source.

In the configuration of FIG. 3, the radio wave sensor device 101a receives the radio wave from the transmission device 900, extracts and corrects the feature of the reception signal, and transmits the corrected feature to the identifying processing device 102a. The identifying processing device 102a determines (identifies) the transmission device 900 of the radio wave transmitting source by comparing the feature of the reception signal from each of the radio wave sensor devices 101a with the transmission radio wave feature.

Figure 4:
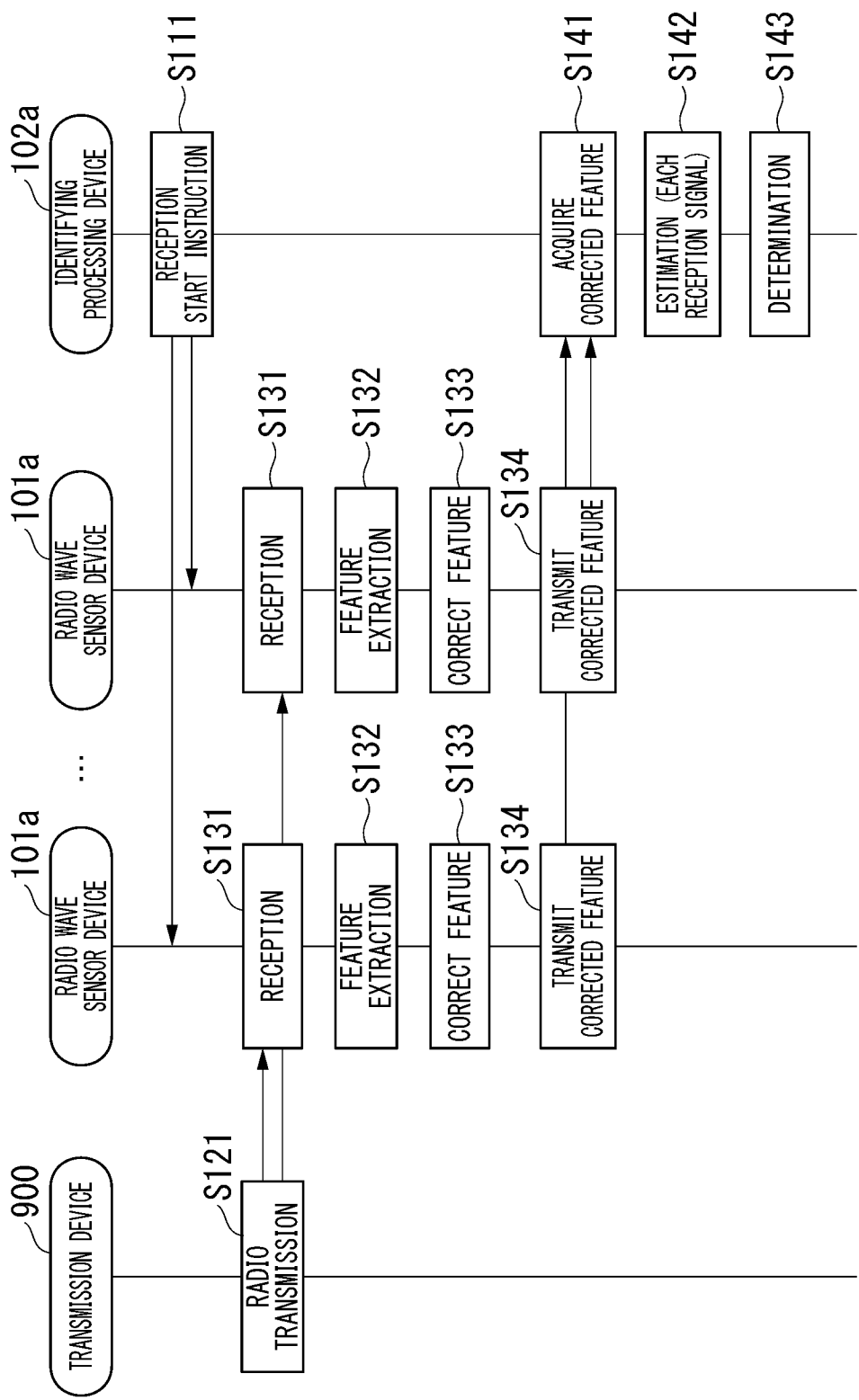
FIG. 4 is a sequence diagram showing an example of the operation of the transmission device identification system according to the second example embodiment.

FIG. 4 is a sequence diagram showing an example of the operation of the transmission device identification system 10 according to the second example embodiment.

In the process of FIG. 4, the identifying processing device 102a instructs each of the radio wave sensor devices 101a to start receiving (sequence S111). Each of the radio wave sensor devices 101a starts waiting for radio waves based on this instruction. Further, according to this instruction, the identifying processing device 102a causes the radio wave sensor device 101a to set parameters such as the frequency of the transmission radio wave of the transmission device 900 and the time for the radio wave sensor device 101a to receive the radio wave.

Next, when the transmission device 900 transmits a radio wave (sequence S121), each reception unit 11 of the radio wave sensor device 101a receives the radio wave from the transmission device 900 (sequence S131). As described above, it is not necessary for the transmission device 900 to transmit the radio wave to the radio wave sensor device 101a. Further, not all of the installed radio wave sensor devices 101a may receive the radio waves from the transmission device 900. Some of the installed radio wave sensor devices 101a may receive radio waves. It is sufficient that only those radio wave sensor devices 101a that received the radio wave proceed to the next step.

In each of the radio wave sensor devices 101a that have received the radio waves from the transmission device 900, the feature extraction unit 121 extracts the feature of the reception signal (sequence S132). Then, the feature correction unit 122 corrects the feature extracted by the feature extraction unit 121 on the basis of the receiver characteristic of the reception unit 11 (sequence S133). The radio wave sensor device 101a transmits the corrected feature to the identifying processing device 102a (sequence S134).

The identifying processing device 102a acquires (receives) the corrected feature transmitted by each of the radio wave sensor devices 101a that have received radio waves from the transmission device 900 (sequence S141). The individual estimation unit 131 of the identifying processing device 102a estimates the transmission device 900 that is a radio wave transmitting source for each corrected feature received by the identifying processing device 102a (therefore, for each reception signal whose radio wave has been received by the radio wave sensor device 101a) (sequence S142). The determination unit 132 receives information of the transmission device 900 that is a radio wave transmitting source estimated by the individual estimation unit 131 for each radio wave sensor device 101*a* (in other words, for each corrected feature), and determines which of the plurality of transmission devices 900 registered in the feature database 14 the transmission device 900 that is a radio wave transmitting source is (sequence S143).

After the sequence S143, the transmission device identification system 10 ends the process of FIG. 4.

As described above, the feature extraction unit 121 is provided for each reception unit 11 and extracts the feature of the reception signal of the reception unit 11. The feature correction unit 122 corrects the feature of the reception signal of the reception unit 11 on the basis of the receiver characteristic of the reception unit 11.

In this way, the feature correction unit 122 corrects the feature of the reception signal of the reception unit 11 based on the receiver characteristic of the reception unit 11, and thereby it is possible to lessen the influence of the receiver characteristic of the reception unit 11 on the feature of the reception signal. As a result, the identification unit 13 can identify the transmission device 900 that is a radio wave transmitting source with higher accuracy by using the feature of the reception signal after correction.

Further, on the point of the feature correction unit 122 correcting the feature, the amount of data per unit time of the data to be corrected is smaller than that in the case of correcting the reception signal of the reception unit 11. In this respect, the load on the feature correction unit 122 can be relatively small.

Further, the individual radio wave sensor devices 101*a* reduce the influence of the receiver characteristic of the reception unit 11 on the feature of the reception signal, and so, for example, the identifying processing device 102*a* or the like need not centrally manage the receiver characteristic of the reception unit 11 of each radio wave sensor device 101*a*. For example, the operator of the transmission device identification system 10 does not need to construct a database of receiver characteristic of the reception unit 11 of each radio wave sensor device 101*a* and update the data. In this respect, even when the number of radio wave sensor devices 101*a* is large, the burden on the operator of the transmission device identification system 10 can be comparatively small.

Further, the transmission device identification system 10 includes one or more radio wave sensor devices 101*a* and the identifying processing device 102*a*. The radio wave sensor device 101*a* includes the reception unit 11, the feature extraction unit 121, and the feature correction unit 122. The identifying processing device 102*a* includes the identification unit 13.

With such a configuration, it is sufficient to transmit the feature of the corrected reception signal from the radio wave sensor device 101*a* to the identifying processing device 102*a*, and so the communication amount is relatively smaller than in the case of transmitting the reception signal itself.

Further, the receiver characteristic of the reception unit 11 used by the feature correction unit 122 for correction is not limited to a particular one. The feature correction unit 122 may use one or a plurality of the frequency characteristic, error vector amplitude, IQ phase error, IQ imbalance amount, frequency offset, and symbol clock error of the reception unit 11 as the receiver characteristic.

Thereby, it is possible to select the receiver characteristic of the reception unit 11 used by the feature correction unit 122 for correction in accordance with factors such as the characteristic of the radio wave transmitted by the transmission device 900 and the receiver characteristic of the reception unit 11. In this respect, it is expected that the correction performed by the feature correction unit 122 is effective in reducing the influence of the receiver characteristic of the reception unit 11 on the identification of the transmission device 900 that is the radio wave transmitting source.

Further, the feature extracted from the reception signal of the reception unit 11 by the feature extraction unit 121 is not limited to a specific type. The feature extraction unit 121 may extract a feature showing one or a plurality of the transient, the power spectral density of the preamble portion, the error vector amplitude, the IQ phase error, the IQ imbalance amount, the frequency offset, and the symbol clock error of the reception signal of the reception unit 11.

Thereby, the type of feature extracted from the reception signal of the reception unit 11 by the feature extraction unit 121 can be selected according to factors such as the characteristic of the radio wave transmitted by the transmission device 900 and the receiver characteristic of the reception unit 11. That is, the type of feature used by the identification unit 13 for identification of the transmission device 900 that is a radio wave transmitting source can be selected according to the characteristic of the radio wave transmitted by the transmission device 900 and the receiver characteristic of the reception unit 11. In this respect, it is expected that the identification unit 13 can identify the transmission device 900 that is a radio wave transmitting source with high accuracy.

Third Example Embodiment

The third example embodiment shows a second example in which the first example embodiment is further embodied.

Figure 5:
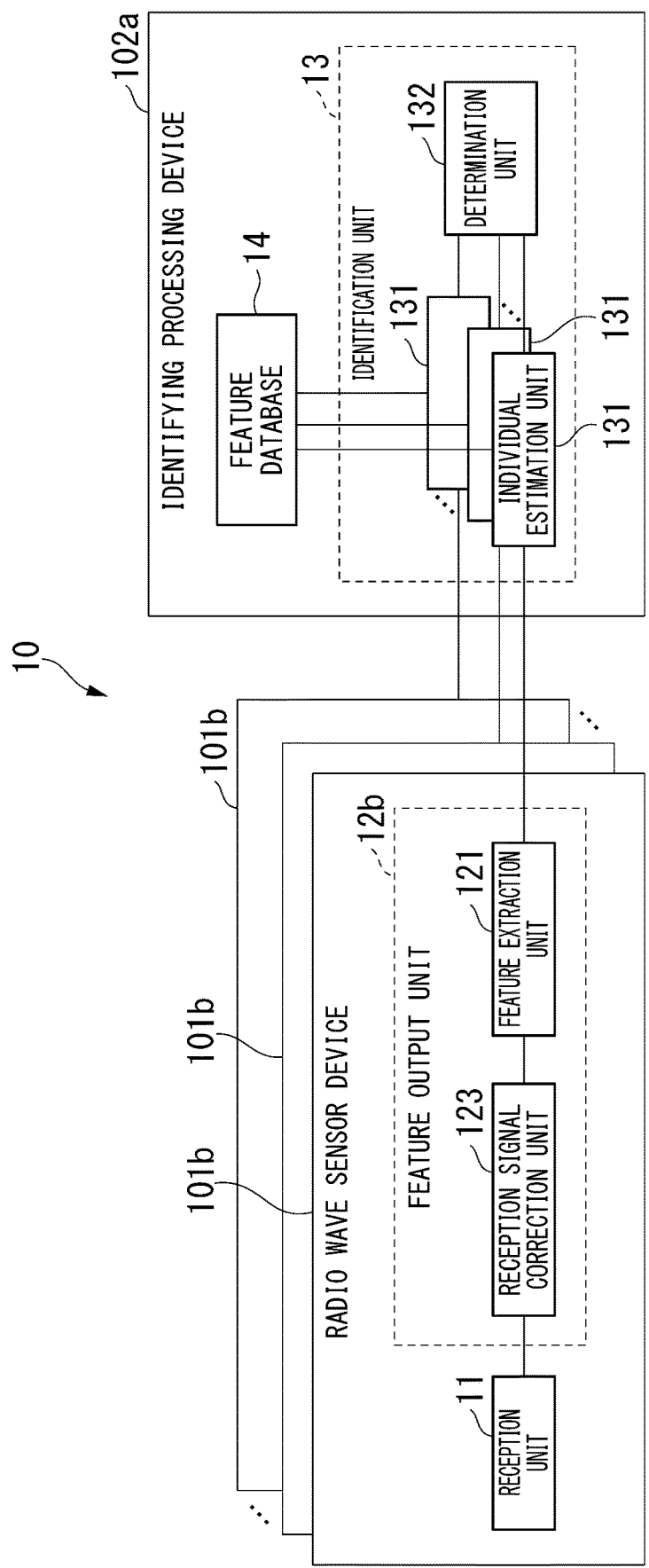
FIG. 5 is a schematic block diagram showing an example of a functional configuration of a transmission device identification system according to a third example embodiment.

FIG. 5 is a schematic block diagram showing an example of the functional configuration of the transmission device identification system according to the third example embodiment. In the configuration shown in FIG. 5, the transmission device identification system 10 includes a radio wave sensor device 101*b* and the identifying processing device 102*a*. The reception unit 11 and a feature output unit 12*b* are mounted on the radio wave sensor device 101*b*. The feature output unit 12*b* includes a reception signal correction unit 123 and the feature extraction unit 121. The identification unit 13 is mounted on the identifying processing device 102*a*, and moreover, the identifying processing device 102*a* includes the feature database 14. The identification unit 13 includes the individual estimation unit 131 and the determination unit 132.

The number of radio wave sensor devices 101*b* included in the transmission device identification system 10 may be one or more. One reception unit 11 is mounted on one radio wave sensor device 101*b*. The reception signal correction unit 123, the feature extraction unit 121, and the individual estimation unit 131 are provided for each reception unit 11.

In the configuration shown in FIG. 3, the feature output unit 12*a* includes the feature extraction unit 121 and the feature correction unit 122. On the other hand, the configuration shown in FIG. 5 differs from the case of FIG. 3 in that the feature output unit 12*b* includes the reception signal correction unit 123 and the feature extraction unit 121. In other respects, the radio wave sensor device 101*b* of FIG. 5 is similar to the radio wave sensor device 101*a* of FIG. 3. The identifying processing device 102*a* of FIG. 5 is similar to the identifying processing device 102*a* of FIG. 3.

As with the case of FIG. 3, instead of the combination of the feature database 14 and the individual estimation unit 131, the identifying processing device 102*a* may include an identification device that receives input of the feature of a reception signal and outputs identification information of a similar transmission radio wave feature.

The reception signal correction unit 123 corrects the reception signal whose radio wave from the transmission device 900 has been received by the reception unit 11. The waveform of the reception signal of the reception unit 11 is a waveform in which the influence of the receiver characteristic of the reception unit 11 is added to the waveform of the transmission radio wave of the transmission device 900. The reception signal correction unit 123 performs correction that reduces the receiver characteristic of the reception unit 11 on the reception signal.

The feature extraction unit 121 receives input of the corrected reception signal from the reception signal correction unit 123, and extracts the feature from the corrected reception signal.

In the second example embodiment, the feature output unit 12a performs correction after extracting the feature from the reception signal, whereas in the third example embodiment, the feature output unit 12b extracts the feature after correcting the reception signal.

Figure 6:
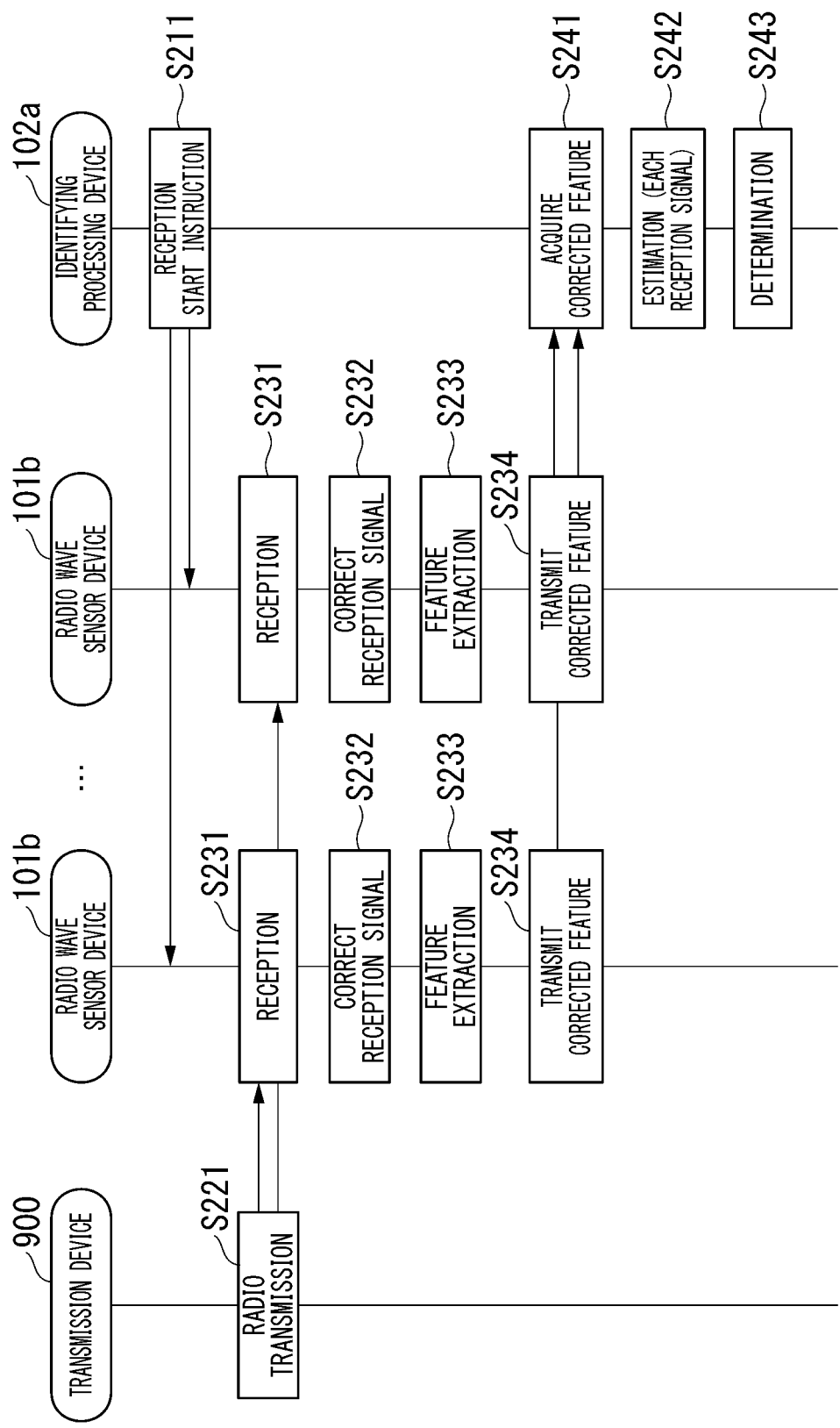
FIG. 6 is a sequence diagram showing an example of the operation of the transmission device identification system according to the third example embodiment.

FIG. 6 is a sequence diagram showing an example of the operation of the transmission device identification system 10 according to the third example embodiment.

The sequences S211 to S231 in FIG. 6 are similar to the sequences S111 to S131 in FIG. 4.

After sequence S231, the reception signal correction unit 123 corrects the reception signal whose radio wave from the transmission device 900 has been received by the reception unit 11 (sequence S232). Then, the feature extraction unit 121 extracts the feature from the reception signal corrected by the reception signal correction unit 123 (sequence S233).

Sequences S234 to S243 are similar to sequences S134 to S143 in FIG. 4.

After sequence S243, the transmission device identification system 10 ends the process of FIG. 6.

As described above, the reception signal correction unit 123 corrects the reception signal of the reception unit 11 based on the receiver characteristic of the reception unit 11. The feature extraction unit 121 is provided for each reception signal correction unit 123, and extracts the feature of the corrected reception signal.

In this way, the reception signal correction unit 123 corrects the reception signal of the reception unit 11 on the basis of the receiver characteristic of the reception unit 11, and thereby it is possible to reduce the influence of the receiver characteristic of the reception unit 11 on the reception signal, and it is possible to reduce the influence of the receiver characteristic of each of the reception units 11 on the feature of the reception signal extracted by the feature extraction unit 121. Thereby, the identification unit 13 can identify the transmission device 900 that is a radio wave transmitting source with higher accuracy by using the feature extracted by the feature extraction unit 121.

In the transmission device identification system 10 according to the third example embodiment, on the point of the reception signal correction unit 123 correcting the reception signal of the reception unit 11, the amount of data per unit time of the data to be corrected is larger than in the case of correcting the feature extracted from the reception signal as in the transmission device identification system 10 according to the second example embodiment. In this respect, although the reception signal correction unit 123 has a larger processing load than the feature correction unit 122, it is expected that, by that amount, the reception signal can be finely adjusted by the correction and the influence of the receiver characteristic of the reception unit 11 on the reception signal can be reduced with higher accuracy. Thereby, it is expected that the identification unit 13 can identify the transmission device 900 that is the radio wave transmitting source with higher accuracy.

Further, the individual radio wave sensor devices 101b reduce the influence of the receiver characteristic of the reception unit 11 on the feature of the reception signal, and so, for example, the identifying processing device 102a or the like does not need to centrally manage the receiver characteristic of the reception unit 11 of each radio wave sensor device 101b. For example, the operator of the transmission device identification system 10 does not need to construct a database of receiver characteristic of the reception unit 11 of each radio wave sensor device 101b and update the data. In this respect, even when the number of radio wave sensor devices 101b is large, the burden on the operator of the transmission device identification system 10 can be comparatively small.

Further, the radio wave sensor device 101b includes the reception unit 11, the reception signal correction unit 123, and the feature extraction unit 121. The identifying processing device 102a includes the identification unit 13.

With such a configuration, it is sufficient to transmit the feature of the corrected reception signal from the radio wave sensor device 101b to the identifying processing device 102a, and so the communication amount can be relatively small.

Further, the receiver characteristic of the reception unit 11 used by the reception signal correction unit 123 for correction is not limited to a particular one. The reception signal correction unit 123 may use one or more of the frequency characteristic, error vector amplitude, IQ phase error, IQ imbalance amount, frequency offset, and symbol clock error of the reception unit 11 as the receiver characteristic.

Thereby, it is possible to select the receiver characteristic of the reception unit 11 used by the reception signal correction unit 123 for correction in accordance with factors such as the characteristic of the radio wave transmitted by the transmission device 900 and the receiver characteristic of the reception unit 11. In this respect, it is expected that the correction performed by the reception signal correction unit 123 is effective in reducing the influence of the receiver characteristic of the reception unit 11 on the identification of the transmission device 900 that is the radio wave transmitting source.

Fourth Example Embodiment

The fourth example embodiment shows a third example in which the first example embodiment is further embodied.

Figure 7:
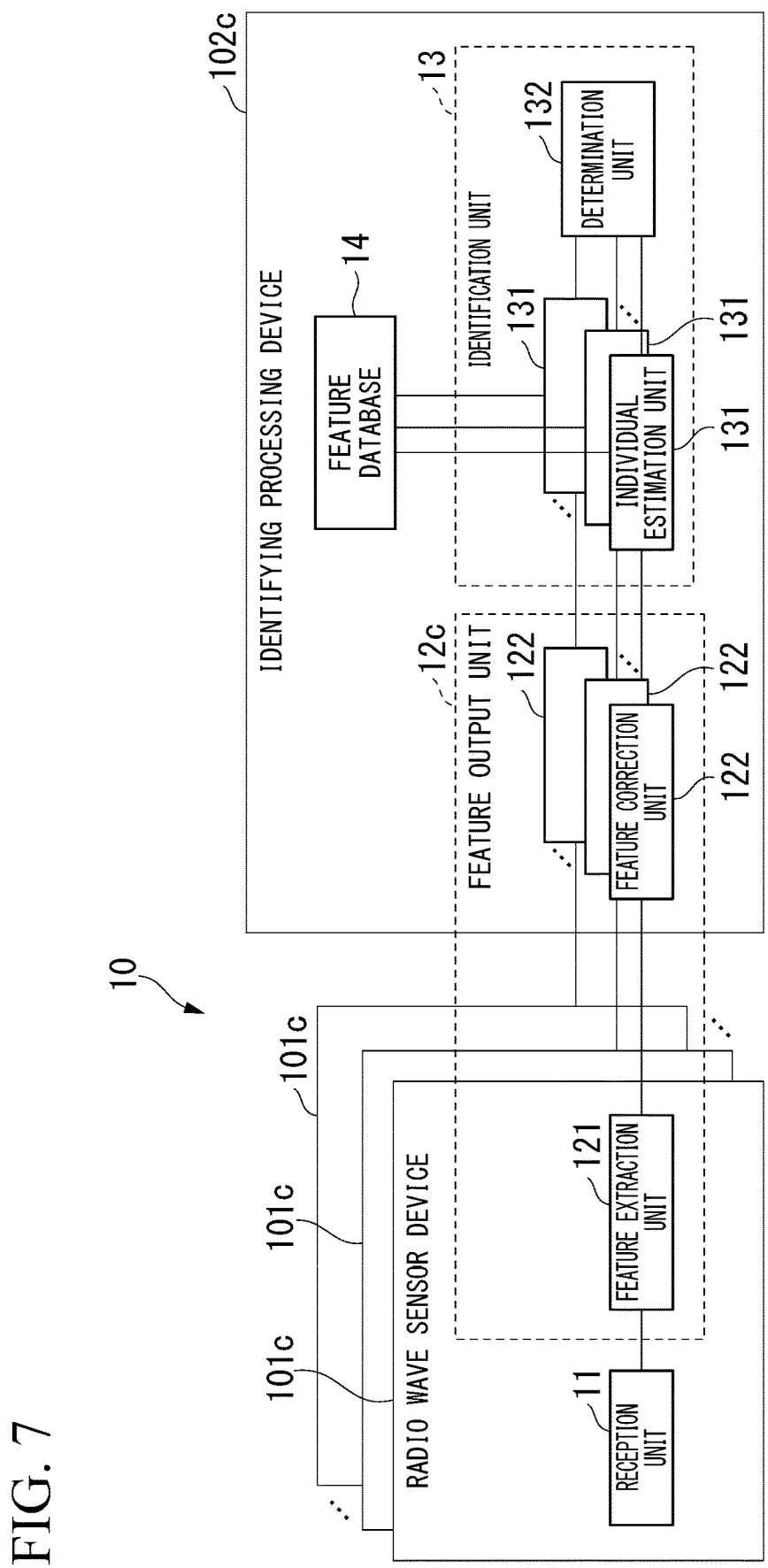
FIG. 7 is a schematic block diagram showing an example of a functional configuration of a transmission device identification system according to a fourth example embodiment.

FIG. 7 is a schematic block diagram showing an example of the functional configuration of the transmission device identification system according to the fourth example embodiment. In the configuration shown in FIG. 7, the transmission device identification system 10 includes a radio wave sensor device 101c and an identifying processing device 102c. The configuration shown in FIG. 7 differs from the case of FIG. 3 in that the feature correction unit 122 is included in the identifying processing device 102c instead of the radio wave sensor device 101c. In other respects, the radio wave sensor device 101c is similar to the radio wave sensor device 101a of FIG. 3, and the identifying processing device 102c is similar to the identifying processing device 102a of FIG. 3.

Therefore, in the configuration shown in FIG. 7, a feature output unit 12c includes the feature extraction unit 121 and the feature correction unit 122. The identification unit 13 includes the individual estimation unit 131 and the determination unit 132. The radio wave sensor device 101c includes the reception unit 11 and the feature extraction unit 121 of the feature output unit 12c. The identifying processing device 102c includes the feature correction unit 122 of the feature output unit 12c, the identification unit 13, and the feature database 14.

The number of radio wave sensor devices 101c included in the transmission device identification system 10 may be one or more. One reception unit 11 is mounted on one radio wave sensor device 101c. The feature extraction unit 121, the feature correction unit 122, and the individual estimation unit 131 are provided for each reception unit 11.

As with the case of FIG. 3, instead of the combination of the feature database 14 and the individual estimation unit 131, the identifying processing device 102c may include an identification device that receives input of the feature of a reception signal and outputs identification information of a similar transmission radio wave feature.

In the configuration of FIG. 7, the radio wave sensor device 101c receives the radio wave from the transmission device 900, extracts the feature of the reception signal, and transmits the extracted feature to the identifying processing device 102c. The identifying processing device 102c corrects the feature of the reception signal from each of the radio wave sensor devices 101c, compares the corrected feature with the transmission radio wave feature stored in the feature database 14, and determines the transmission device 900 that is a radio wave transmitting source.

Figure 8:
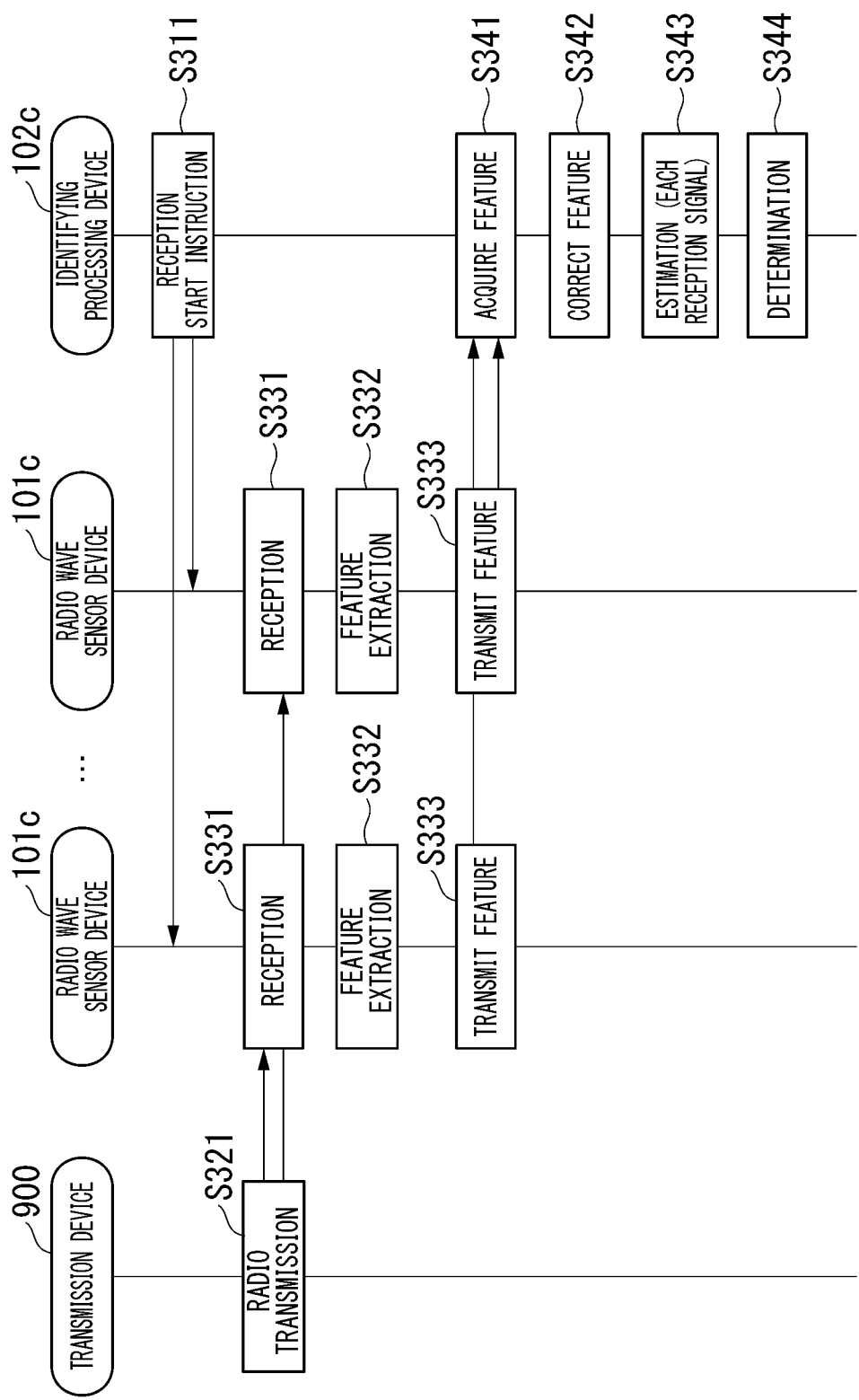
FIG. 8 is a sequence diagram showing an example of the operation of the transmission device identification system according to the fourth example embodiment.

FIG. 8 is a sequence diagram showing an example of the operation of the transmission device identification system 10 according to the fourth example embodiment.

The sequences S311 to S332 in FIG. 8 are similar to the sequences S111 to S132 in FIG. 4. After sequence S332, the radio wave sensor device 101c transmits the feature of the reception signal extracted by the feature extraction unit 121 to the identifying processing device 102c (sequence S333).

The identifying processing device 102c acquires (receives) the feature transmitted by each of the radio wave sensor devices 101c that have received radio waves from the transmission device 900 (sequence S341). The feature correction unit 122 of the identifying processing device 102c corrects the feature on the basis of the receiver characteristic of the reception unit 11 for each feature received by the identifying processing device 102c (accordingly, for each reception signal whose radio wave has been received by the radio wave sensor device 101c) (sequence S342).

Sequences S343 to S344 are similar to sequences S142 to S143 in FIG. 4.

After sequence S344, the transmission device identification system 10 ends the process of FIG. 8.

As described above, the radio wave sensor device 101c includes the reception unit 11 and the feature extraction unit 121. The identifying processing device 102c includes the feature correction unit 122 and the identification unit 13.

With such a configuration, it is sufficient to transmit the feature of the reception signal from the radio wave sensor device 101c to the identifying processing device 102c, and so the communication amount can be relatively small.

Further, in the transmission device identification system 10 according to the fourth example embodiment, it is possible to make the configuration of the radio wave sensor device 101c relatively simpler than that of the radio wave sensor devices 101a and 101b in that the identifying processing device 102c includes the feature correction unit 122. In this respect, the manufacturing cost and the operating cost of the radio wave sensor device 101c can be relatively low.

For example, when a large number of radio wave sensor devices 101c are arranged to cover a wide space, the effect becomes large.

Fifth Example Embodiment

The fifth example embodiment shows a fourth example in which the first example embodiment is further embodied.

Figure 9:
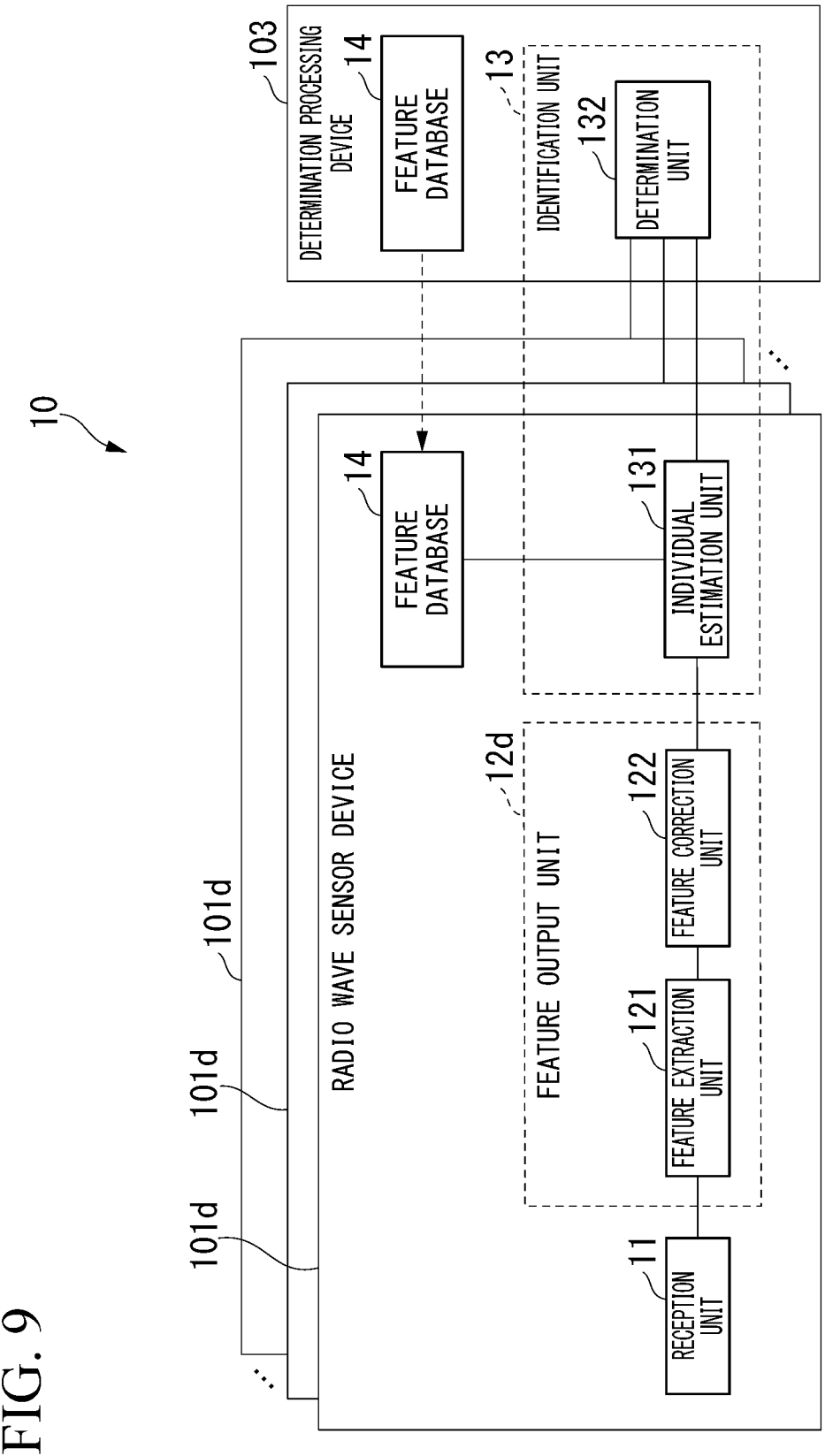
FIG. 9 is a schematic block diagram showing an example of a functional configuration of a transmission device identification system according to a fifth example embodiment.

FIG. 9 is a schematic block diagram showing an example of the functional configuration of the transmission device identification system according to the fifth example embodiment. In the configuration shown in FIG. 9, the transmission device identification system 10 includes a radio wave sensor device 101d and a determination processing device 103. The configuration shown in FIG. 9 differs from the case of FIG. 3 in that the individual estimation unit 131 is included in the radio wave sensor device 101d instead of the determination processing device 103, and the radio wave sensor device 101d includes the feature database 14. In other respects, the radio wave sensor device 101d is similar to the radio wave sensor device 101a of FIG. 3, and the determination processing device 103 is similar to the identifying processing device 102a of FIG. 3.

Accordingly, in the configuration shown in FIG. 9, a feature output unit 12d includes the feature extraction unit 121 and the feature correction unit 122. The identification unit 13 includes the individual estimation unit 131 and the determination unit 132. The radio wave sensor device 101d includes the reception unit 11, the feature output unit 12d, the individual estimation unit 131 of the identification unit 13, and the feature database 14. The determination processing device 103 includes the determination unit 132 of the identification unit 13 and the feature database 14.

The number of radio wave sensor devices 101d provided in the transmission device identification system 10 may be one or more. One reception unit 11 is mounted on one radio wave sensor device 101d. The feature extraction unit 121, the feature correction unit 122, and the individual estimation unit 131 are provided for each reception unit 11.

The feature database 14 included in the determination processing device 103 is for distribution to each of the radio wave sensor devices 101d. The determination processing device 103 may have a configuration not including the feature database 14, such as a server device for distributing the feature database 14 being provided as a device separate from the determination processing device.

As with the case of FIG. 3, instead of the combination of the feature database 14 and the individual estimation unit 131, the radio wave sensor device 101d may include an identification device that receives input of the feature of a reception signal and outputs identification information of a similar transmission radio wave feature.

Figure 10:
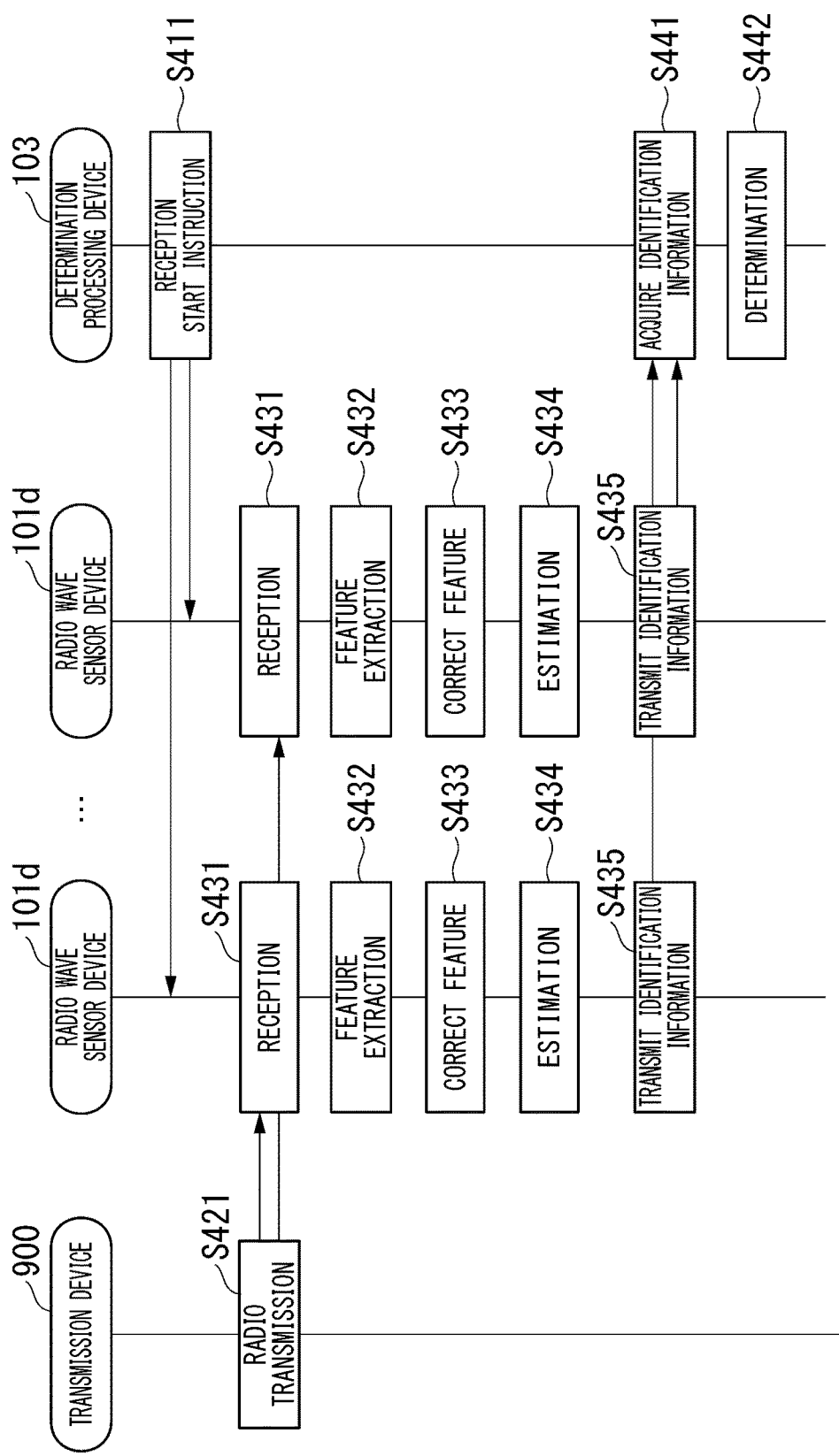
FIG. 10 is a sequence diagram showing a first example of the operation of the transmission device identification system according to the fifth example embodiment.

FIG. 10 is a sequence diagram showing a first example of the operation of the transmission device identification system 10 according to the fifth example embodiment.

The sequences S411 to S433 in FIG. 10 are similar to the sequences S111 to S133 in FIG. 4. After the sequence S433, the individual estimation unit 131 estimates the transmission device 900 that is a radio wave transmitting source based on the corrected feature (sequence S434). Specifically, as described above, the individual estimation unit 131 compares the feature of the reception signal with the transmission radio wave feature for each transmission device 900, and identifies that the transmission radio wave feature determined to have the highest degree of similarity to the feature of the reception signal is the radio wave feature of the transmission device 900 that is a radio wave transmitting source.

The radio wave sensor device 101*d* transmits identification information of the transmission device 900 estimated by the individual estimation unit 131 (identification information of the transmission radio wave feature) to the determination processing device 103 (sequence S435).

The determination processing device 103 receives the identification information transmitted by each of the radio wave sensor devices 101*d* that have received radio waves from the transmission device 900 (sequence S441). The determination unit 132 of the determination processing device 103 determines which of the transmission devices 900 identified by the identification information received by the determination processing device 103 is the transmission device 900 that is a radio wave transmitting source (sequence S442).

After the sequence S442, the transmission device identification system 10 ends the process of FIG. 10.

Figure 11:
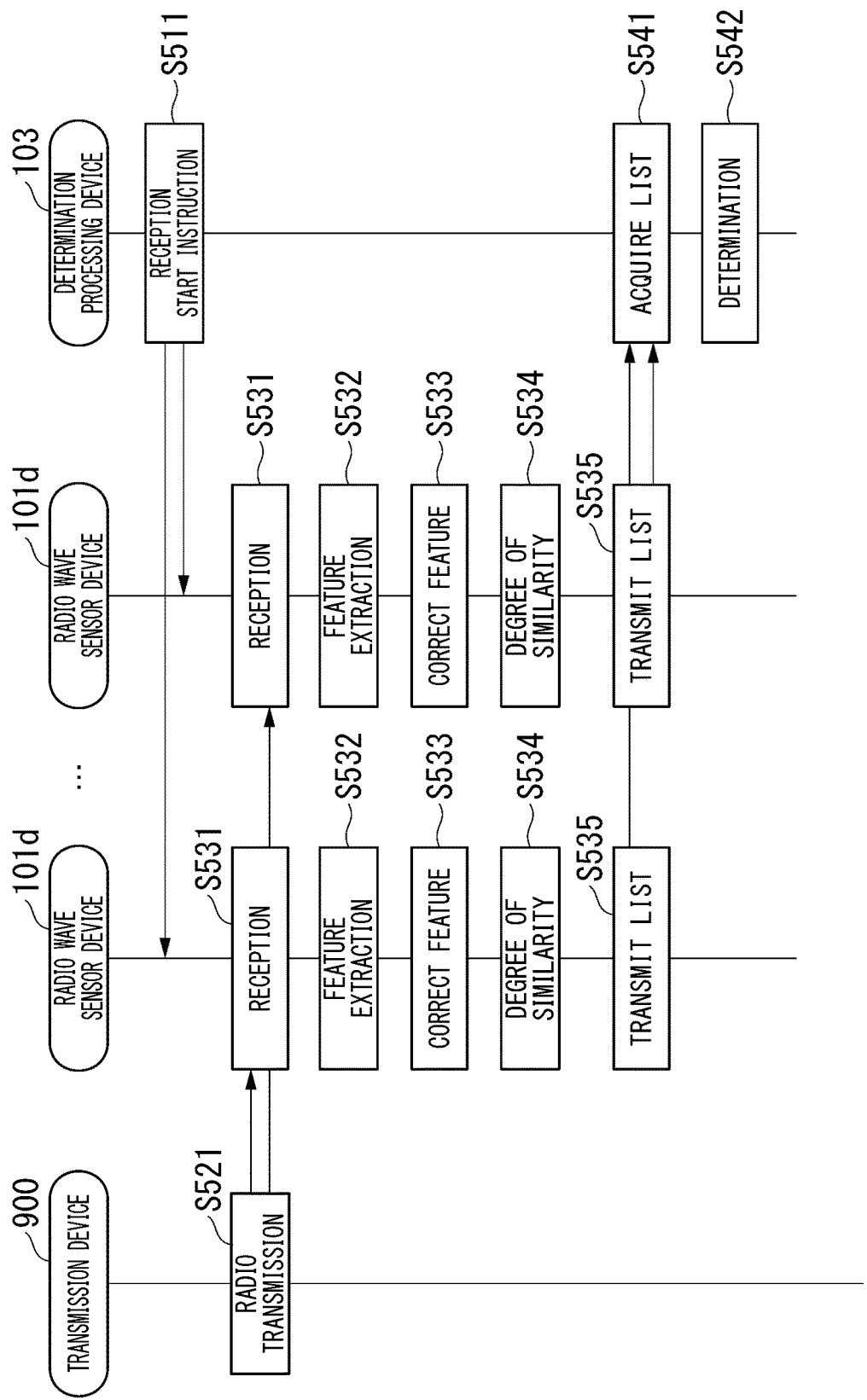
FIG. 11 is a sequence diagram showing a second example of the operation of the transmission device identification system according to the fifth example embodiment.

FIG. 11 is a sequence diagram showing a second example of the operation of the transmission device identification system 10 according to the fifth example embodiment.

The sequences S511 to S533 in FIG. 11 are similar to the sequences S411 to S433 in FIG. 10. After the sequence S533, the individual estimation unit 131 computes the degree of similarity of the feature of the reception signal and the transmission radio wave feature for each transmission device 900 (each transmission radio wave feature stored by the feature database 14) on the basis of the corrected feature (sequence S534). The radio wave sensor device 101*d* transmits to the determination processing device 103 a list in which the identification information of the transmission device 900 (identification information of the transmission radio wave feature) is associated with the degree of similarity between the transmission radio wave feature of the transmission device 900 and the feature of the reception signal (sequence S535).

The determination processing device 103 receives the list transmitted by each of the radio wave sensor devices 101*d* that have received radio waves from the transmission devices 900 (sequence S541). The determination unit 132 of the determination processing device 103 determines which transmission device 900 the transmission device 900 that is a radio wave transmitting source is, on the basis of the list received by the determination processing device 103 (sequence S542).

After the sequence S542, the transmission device identification system 10 ends the process of FIG. 11.

As described above, the individual estimation unit 131 estimates the transmission device 900 of the radio wave transmitting source for each reception signal of one or more reception units 11. The determination unit 132 determines which of the transmission devices 900 estimated by the individual estimation unit 131 for each reception signal the transmission device 900 that is a radio wave transmitting source is. The radio wave sensor device 101*d* includes the reception unit 11, the feature extraction unit 121, the feature correction unit 122, and the individual estimation unit 131. The determination processing device 103 includes the determination unit 132.

Thereby, it is sufficient for the radio wave sensor device 101*d* to transmit the estimation result of the individual estimation unit 131 estimating the transmission device 900 that is the radio wave transmitting source to the determination processing device 103, and it is expected that the amount of communication can be reduced.

Regarding the transmission of a feature database (transmission of the transmission radio wave feature) from the determination processing device 103 to the radio wave sensor device 101*d*, the communication load can be relatively small by performing the transmission at a time when there is enough communication bandwidth.

Further, the radio wave sensor device 101*d* transmits the identification information of the transmission device 900 estimated by the individual estimation unit 131 to be the transmission device 900 that is the radio wave transmitting source to the determination processing device 103. The determination unit 132 determines which of the transmission devices 900 identified by the identification information the transmission device 900 that is a radio wave transmitting source is.

Thereby, it is sufficient for the radio wave sensor device 101*d* to transmit the identification information of the transmission device 900 (identification information of the transmission radio wave feature) to the determination processing device 103, and the amount of communication can be reduced.

Further, the determination unit 132 determines, by a majority vote of the identification information transmitted by the radio wave sensor device 101*d*, which of the transmission devices identified by the identification information the transmission device 900 that is a radio wave transmitting source is.

Thereby, the determination unit 132 can determine the transmission device 900 that is the radio wave transmitting source by a comparatively simple process of taking a majority vote of the identification information, and in this respect the load of the determination unit 132 can be reduced.

Further, the individual estimation unit 131 calculates the degree of certainty that, for each of the one or more transmission devices 900, that transmission device 900 is the transmission device 900 that is the radio wave transmitting source. The radio wave sensor device 101*d*, for each of the one or more transmission devices 900, transmits the identification information of the transmission device 900 and the degree of certainty calculated by the individual estimation unit 131 to the determination processing device 103. The determination unit 132 determines which of the transmission devices identified by the identification information the transmission device 900 that is a radio wave transmitting source is, on the basis of the identification information and the degree of certainty transmitted by the determination processing device 103.

The determination unit 132 can determine the transmission device 900 that is the radio wave transmitting source with high accuracy in that it determines the transmission device 900 that is the radio wave transmitting source using the degree of certainty calculated by the individual estimation unit 131.

Sixth Example Embodiment

The sixth example embodiment shows a fifth example in which the first example embodiment is further embodied.

Figure 12:
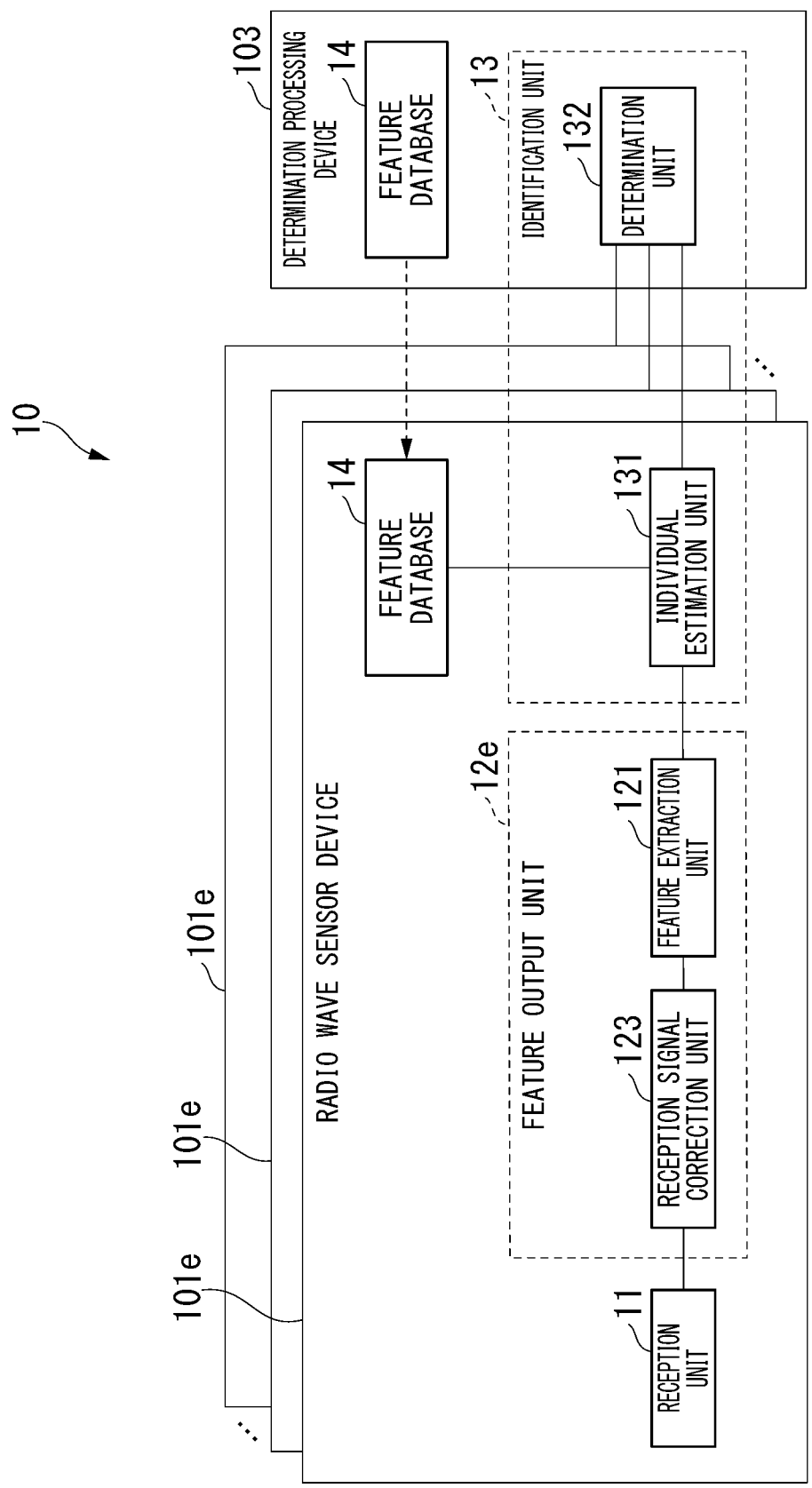
FIG. 12 is a schematic block diagram showing an example of a functional configuration of the transmission device identification system according to a sixth example embodiment.

FIG. 12 is a schematic block diagram showing an example of the functional configuration of the transmission device identification system according to the sixth example embodiment. In the configuration shown in FIG. 12, the transmission device identification system 10 includes a radio wave sensor device 101*e* and the determination processing device 103.

In the configuration shown in FIG. 9, the feature output unit 12d includes the feature extraction unit 121 and the feature correction unit 122. In contrast, the configuration shown in FIG. 12 differs from the case of FIG. 9 in that a feature output unit 12e includes the reception signal correction unit 123 and the feature extraction unit 121. Other than that, the radio wave sensor device 101e of FIG. 12 is similar to the radio wave sensor device 101d of FIG. 9.

The determination processing device 103 of FIG. 5 is similar to the determination processing device 103 of FIG. 9.

Accordingly, in the configuration shown in FIG. 12, the feature output unit 12e includes the reception signal correction unit 123 and the feature extraction unit 121. The identification unit 13 includes the individual estimation unit 131 and the determination unit 132. The radio wave sensor device 101e includes the reception unit 11, the feature output unit 12e, the individual estimation unit 131 of the identification unit 13, and the feature database 14. The determination processing device 103 includes the determination unit 132 of the identification unit 13 and the feature database 14.

The number of radio wave sensor devices 101e included in the transmission device identification system 10 may be one or more. One reception unit 11 is mounted on one radio wave sensor device 101e. The reception signal correction unit 123, the feature extraction unit 121, and the individual estimation unit 131 are provided for each reception unit 11.

The feature database 14 included in the determination processing device 103 is for distribution to each of the radio wave sensor devices 101e. The determination processing device 103 may have a configuration not including the feature database 14, such as a server device for distributing the feature database 14 being provided as a device separate from the determination processing device.

As with a the case of FIG. 3, instead of the combination of the feature database 14 and the individual estimation unit 131, the radio wave sensor device 101e may include an identification device that receives input of the feature of a reception signal and outputs identification information of a similar transmission radio wave feature.

Figure 13:
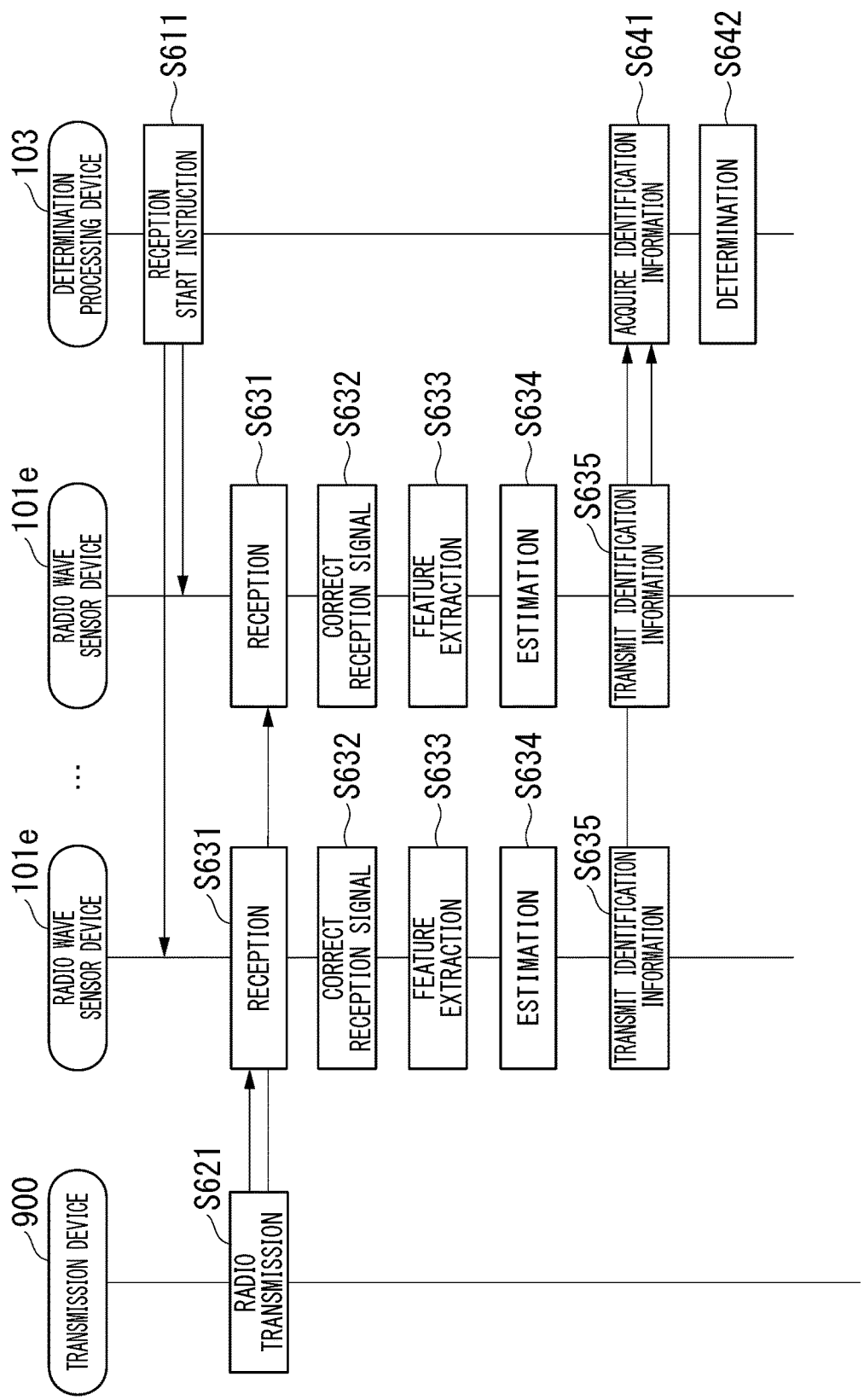
FIG. 13 is a sequence diagram showing a first example of the operation of the transmission device identification system according to the sixth example embodiment.

FIG. 13 is a sequence diagram showing a first example of the operation of the transmission device identification system 10 according to the sixth example embodiment.

The sequences S611 to S631 in FIG. 13 are similar to the sequences S411 to S431 in FIG. 10.

After the sequence S631, the reception signal correction unit 123 corrects the reception signal whose radio wave from the transmission device 900 has been received by the reception unit 11 receiving (sequence S632). Then, the feature extraction unit 121 extracts the feature from the reception signal corrected by the reception signal correction unit 123 (sequence S633).

Sequences S634 to S642 are similar to sequences S434 to S442 in FIG. 10.

After sequence S642, the transmission device identification system 10 ends the process of FIG. 13.

Figure 14:
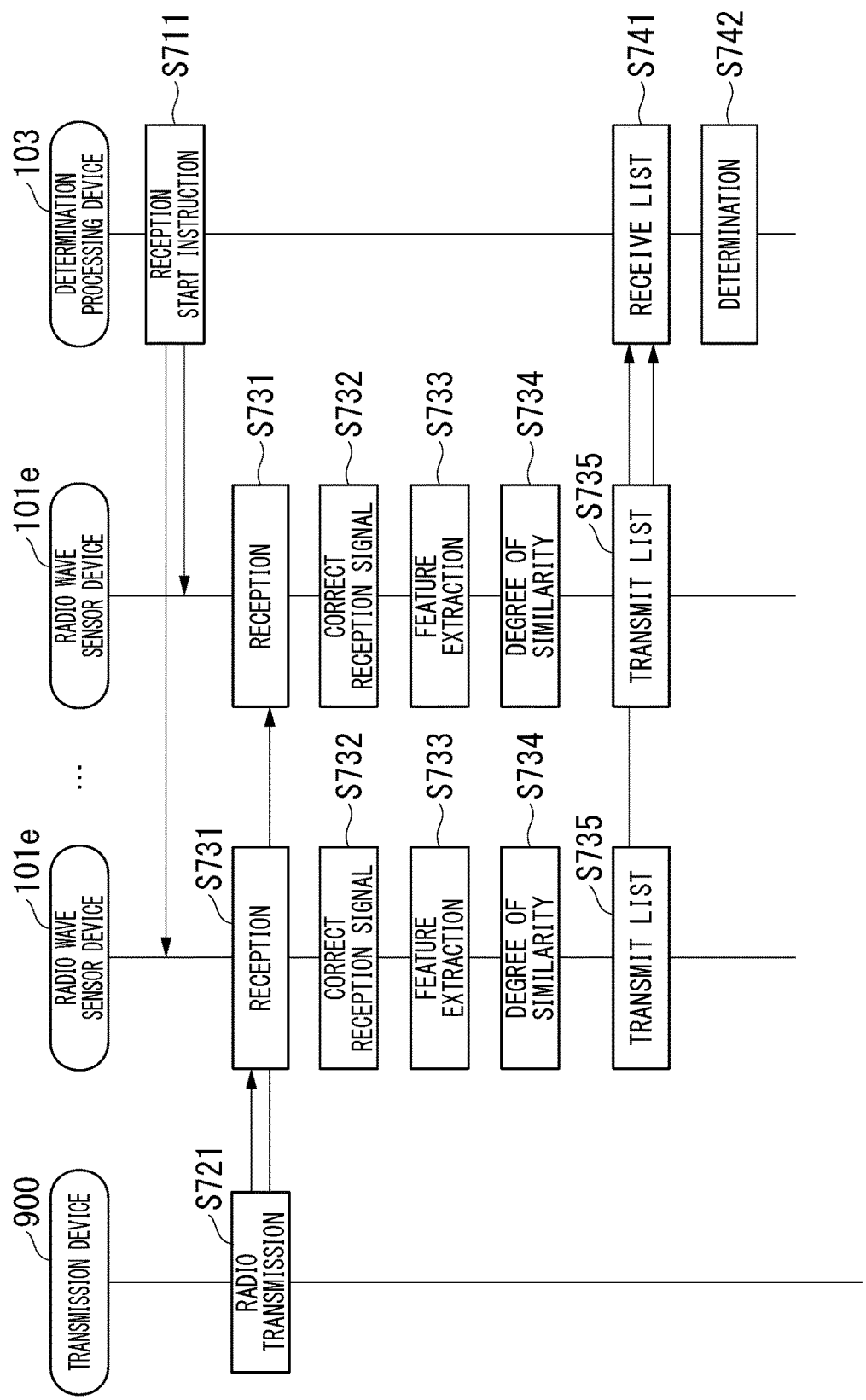
FIG. 14 is a sequence diagram showing a second example of the operation of the transmission device identification system according to the sixth example embodiment.

FIG. 14 is a sequence diagram showing a second example of the operation of the transmission device specifying system 10 according to the sixth example embodiment.

The sequences S711 to S731 in FIG. 14 are similar to the sequences S511 to S531 in FIG. 11.

After the sequence S731, the reception signal correction unit 123 corrects the reception signal whose radio wave from the transmission device 900 has been received by the reception unit 11 (sequence S732). Then, the feature extraction unit 121 extracts the feature of the reception signal corrected by the reception signal correction unit 123 (sequence S733).

Sequences S734 to S742 are similar to sequences S534 to S542 in FIG. 11.

After sequence S742, the transmission device identification system 10 ends the process of FIG. 14.

As described above, the individual estimation unit 131 estimates the transmission device 900 of the radio wave transmitting source for each reception signal of the one or more reception units 11. The determination unit 132 determines which of the transmission devices 900 estimated by the individual estimation unit 131 for each reception unit 11 the transmission device 900 that is a radio wave transmitting source is. The radio wave sensor device 101e includes the reception unit 11, the reception signal correction unit 123, the feature extraction unit 121, and the individual estimation unit 131. The determination processing device 103 includes the determination unit 132.

Thereby, it is sufficient for the radio wave sensor device 101e to transmit the estimation result of the individual estimation unit 131 estimating the transmission device 900 that is the radio wave transmitting source to the determination processing device 103, and it is expected that the amount of communication can be reduced.

Regarding the transmission of the feature database from the determination processing device 103 to the radio wave sensor device 101e (transmission of the transmission radio wave feature), the communication load can be relatively small by performing transmission at a time when there is enough communication bandwidth.

Seventh Example Embodiment

The seventh example embodiment shows a modification of the first example embodiment.

Figure 15:
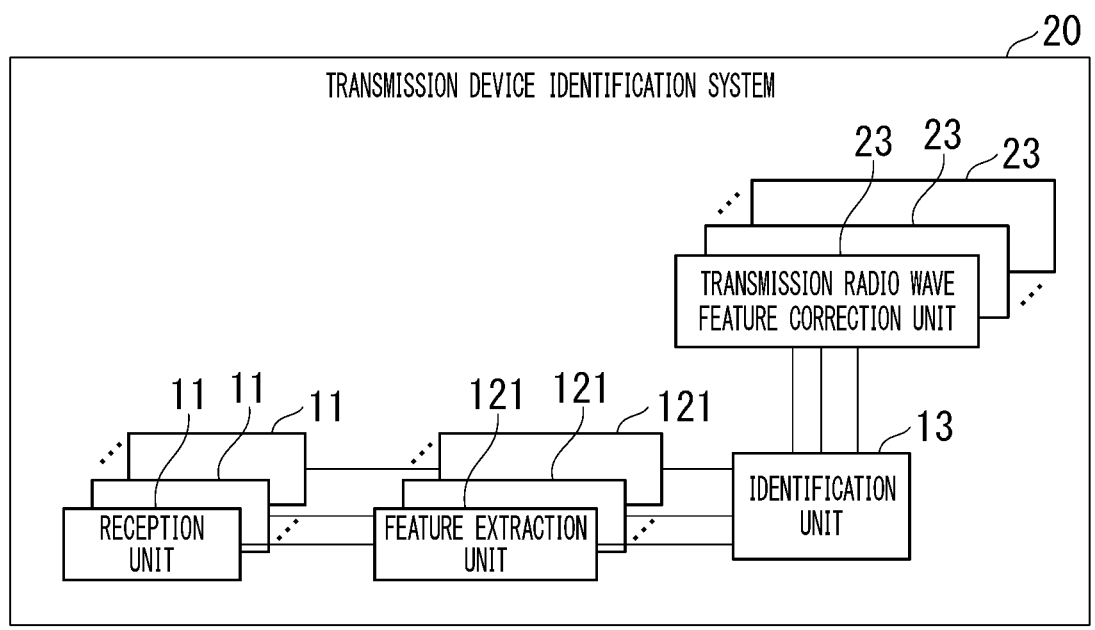
FIG. 15 is a schematic block diagram showing an example of a functional configuration of a transmission device identification system according to a seventh example embodiment.

FIG. 15 is a schematic block diagram showing an example of the functional configuration of the transmission device identification system according to the seventh example embodiment. In the configuration shown in FIG. 15, the transmission device identification system 20 includes the reception unit 11, the feature extraction unit 121, a transmission radio wave feature correction unit 23, and the identification unit 13.

The number of reception units 11 included in the transmission device identification system 20 may be one or more. The feature extraction unit 121 and the transmission radio wave feature correction unit 23 are provided for each reception unit 11.

The reception unit 11 and the feature extraction unit 121 are similar to the case of FIG. 5.

The transmission radio wave feature correction unit 23 corrects the transmission radio wave feature. Specifically, the transmission radio wave feature correction unit 23 is provided for each reception unit 11 and performs correction to reflect the receiver characteristic of the corresponding reception unit 11 in the transmission radio wave feature. As described above, since the receiver characteristic of the reception unit 11 is reflected in both the feature of the reception signal and the transmission radio wave feature, when the transmission device identification system 20 compares the feature of the reception signal and the transmission radio wave feature, the influence of the receiver characteristic of the reception unit 11 is offset.

The identification unit 13 is similar to the case of FIG. 5. Specifically, the input to the identification unit 13 in FIG. 15 differs from the case of FIG. 5, but the processing performed by the identification unit 13 is similar to both the case of FIG. 5 and the case of FIG. 15. In particular, in both the case of FIG. 5 and the case of FIG. 15, the identification unit 13 identifies the transmission device 900 that is the radio wave transmitting source by comparing the feature of the reception signal with the transmission radio wave feature.

In the transmission device identification system 10 of FIG. 1, the feature output unit 12 outputs the feature of the reception signal of the reception unit 11 that has been corrected on the basis of the receiver characteristic of the reception unit 11. In contrast, the transmission device identification system 20 of FIG. 15 includes the feature extraction unit 121 instead of the feature output unit 12, and extracts the feature of the reception signal of the reception unit 11. In the transmission device identification system 20, the influence of the receiver characteristic of the reception unit 11 is not reduced with respect to the feature of the reception signal of the reception unit 11. On the other hand, in the transmission device identification system 20, the transmission radio wave feature correction unit 23 corrects the transmission radio wave feature, and thereby the influence of the receiver characteristic of the reception unit 11 on the comparison between the feature of the reception signal and the transmission radio wave feature is lessened.

Other than that, the transmission device identification system 20 is similar to the transmission device identification system 10.

In the seventh example embodiment, the transmission radio wave feature is corrected on the basis of the receiver characteristic of the reception unit 11. Accordingly, the method of acquiring the information necessary for correcting the transmission radio wave feature is similar to the method of acquiring the information necessary for correcting the receiver characteristic described above.

That is, the information necessary for correcting the transmission radio wave feature is obtained by inputting a specific calibration signal to the reception unit 11 at the time of shipment of the reception unit 11 (for example, a radio wave sensor on which the reception unit 11 is mounted) or when the reception unit 11 is installed, and measuring the amount of deformation (distortion amount) or deviation from the calibration signal. As a generation source of the calibration signal input to the reception unit 11, for example, a device including a high-precision oscillator may be used. Alternatively, as the calibration signal, a downlink signal of a base station of a mobile phone may be used, or a broadcast wave such as for television or radio may be used.

As described above, the feature extraction unit 121 extracts the feature of the reception signal of the reception unit 11 for each reception unit 11. The transmission radio wave feature correction unit 23 corrects the transmission radio wave feature indicating the feature of the transmission radio wave for each transmission device 900 based on the receiver characteristic of the reception unit 11. The identification unit 13 identifies the transmission device 900 that is the radio wave transmitting source based on the feature of the reception signal and the transmission radio wave feature after correction.

The identification unit 13B uses the transmission radio wave feature corrected based on the receiver characteristic of the reception unit 11, and thereby it is possible to reduce the influence of the receiver characteristic of the reception unit 11 on the identification of the transmission device 900 that is the radio wave transmitting source. In particular, the influence of the receiver characteristic of the reception unit 11 on the feature of the reception signal and the influence of the receiver characteristic of the reception unit 11 added to the transmission radio wave feature by the correction are offset.

According to the transmission device identification system 20, in this respect, it is possible to reduce the influence of the factor of the device receiving the radio wave on the identification of the transmission device 900 that is the radio wave transmitting source.

In particular, when registering the transmission radio wave feature, by making corrections so as to reduce the influence of the receiver characteristic of the reception unit 11, it is possible to reduce either the influence of the receiver characteristic of the reception unit 11 at the time of data registration and the influence of the receiver characteristic of the reception unit 11 during execution of identifying processing. On this point, the identification unit 13 can identify the transmission device 900 that is a radio wave transmitting source with higher accuracy.

Eighth Example Embodiment

The eighth example embodiment shows a first example that further embodies the seventh example embodiment.

Figure 16:
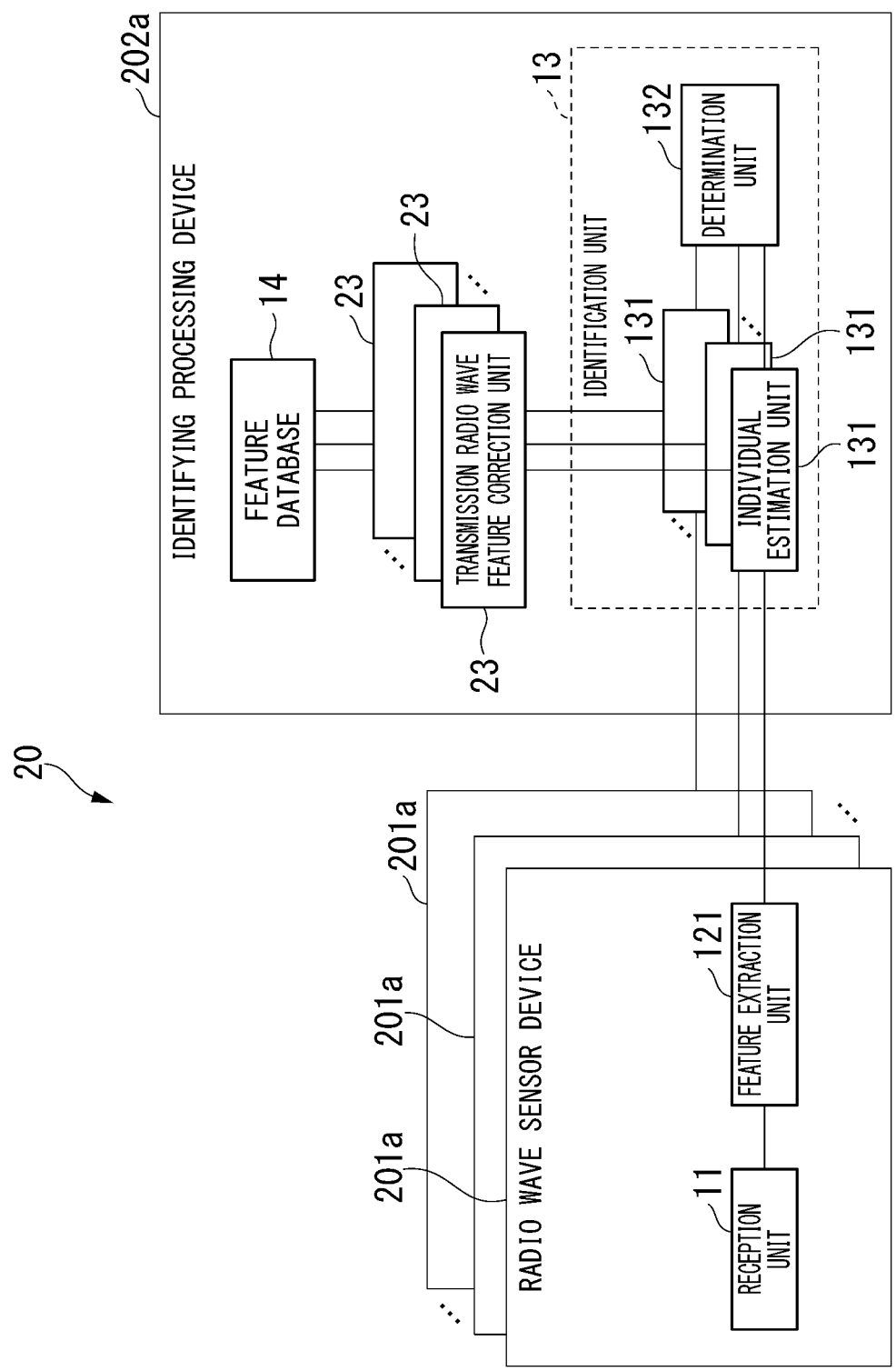
FIG. 16 is a schematic block diagram showing an example of a functional configuration of a transmission device identification system according to an eighth example embodiment.

FIG. 16 is a schematic block diagram showing an example of the functional configuration of the transmission device identification system according to the eighth example embodiment. In the configuration shown in FIG. 16, the transmission device identification system 20 includes a radio wave sensor device 201a and an identifying processing device 202a. The reception unit 11 and the feature extraction unit 121 are mounted on the radio wave sensor device 201a. The transmission radio wave feature correction unit 23 and the identification unit 13 are mounted on the identifying processing device 202a, and moreover the identifying processing device 202a includes the feature database 14. The identification unit 13 includes the individual estimation unit 131 and the determination unit 132.

The number of radio wave sensor devices 201a included in the transmission device identification system 20 may be one or more. One reception unit 11 is mounted on one radio wave sensor device 201a. The feature extraction unit 121, the transmission radio wave feature correction unit 23, and the individual estimation unit 131 are provided for each reception unit 11.

Comparing the configuration of FIG. 3 with the configuration of FIG. 16, while the radio wave sensor device 101a of FIG. 3 includes the feature correction unit 122, the radio wave sensor device 201a of FIG. 16 does not include the feature correction unit 122. On the other hand, the identifying processing device 102a of FIG. 3 does not include the transmission radio wave feature correction unit 23, whereas the identifying processing device 202a of FIG. 15 includes the transmission radio wave feature correction unit 23.

In other respects, the radio wave sensor device 201a of FIG. 16 is similar to the radio wave sensor device 101a of FIG. 3, and the identifying processing device 202a of FIG. 16 is similar to the identifying processing device 102a of FIG. 3.

Figure 17:
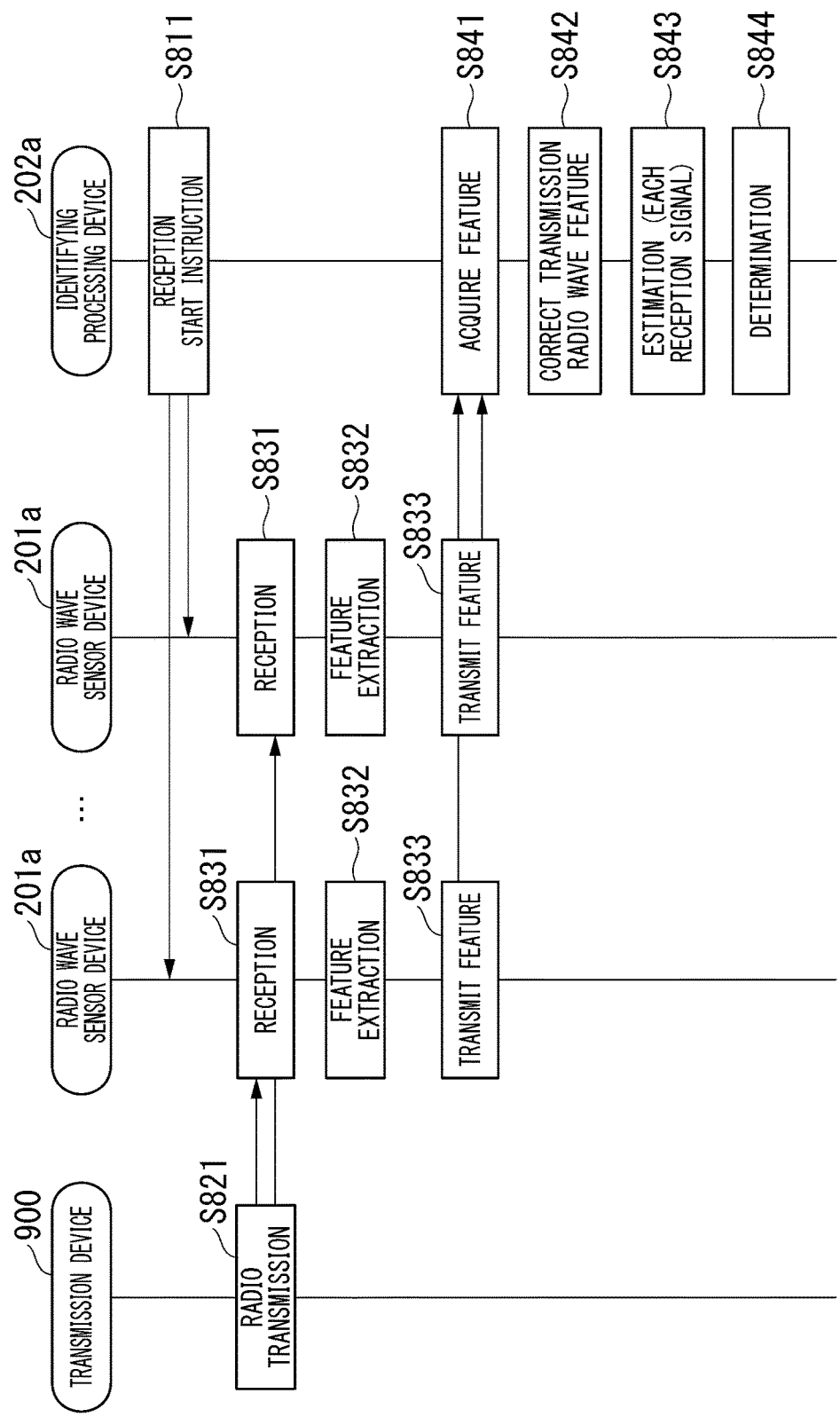
FIG. 17 is a sequence diagram showing an example of the operation of the transmission device identification system according to the eighth example embodiment.

FIG. 17 is a sequence diagram showing an example of the operation of the transmission device identification system 20 according to the eighth example embodiment.

The sequences S811 to S832 in FIG. 17 are similar to the sequences S111 to S132 in FIG. 4. After the sequence S832, the radio wave sensor device 201a transmits the feature of the reception signal extracted by the feature extraction unit 121 to the identifying processing device 202a (sequence S833).

The identifying processing device 202a acquires (receives) the feature transmitted by each of the radio wave sensor devices 201a that have received radio waves from the transmission device 900 (sequence S841). The transmission radio wave feature correction unit 23 of the identifying processing device 202a corrects the transmission radio wave feature (sequence S842).

The sequences S843 and S844 are similar to the sequences S142 and S143 in FIG. 4.

After sequence S844, the transmission device identification system 20 ends the process of FIG. 17.

As described above, the radio wave sensor device 201a includes the reception unit 11 and the feature extraction unit 121. The identifying processing device 202a includes the transmission radio wave feature correction unit 233 and the identification unit 13.

With such a configuration, it is sufficient to transmit the feature of the reception signal from the radio wave sensor device 201a to the identifying processing device 202a, and the communication amount can be relatively small.

Further, the configuration of the radio wave sensor device 201a can be made relatively simple in that the identifying processing device 202a includes the transmission radio wave feature correction unit 23. In this respect, the manufacturing cost and the operating cost of the radio wave sensor device 201a can be relatively low, and for example, it becomes relatively easy to arrange a large number of radio wave sensor devices 201a in order to cover a wide space.

Ninth Example Embodiment

The ninth example embodiment shows a second example in which the seventh example embodiment is further embodied.

Figure 18:
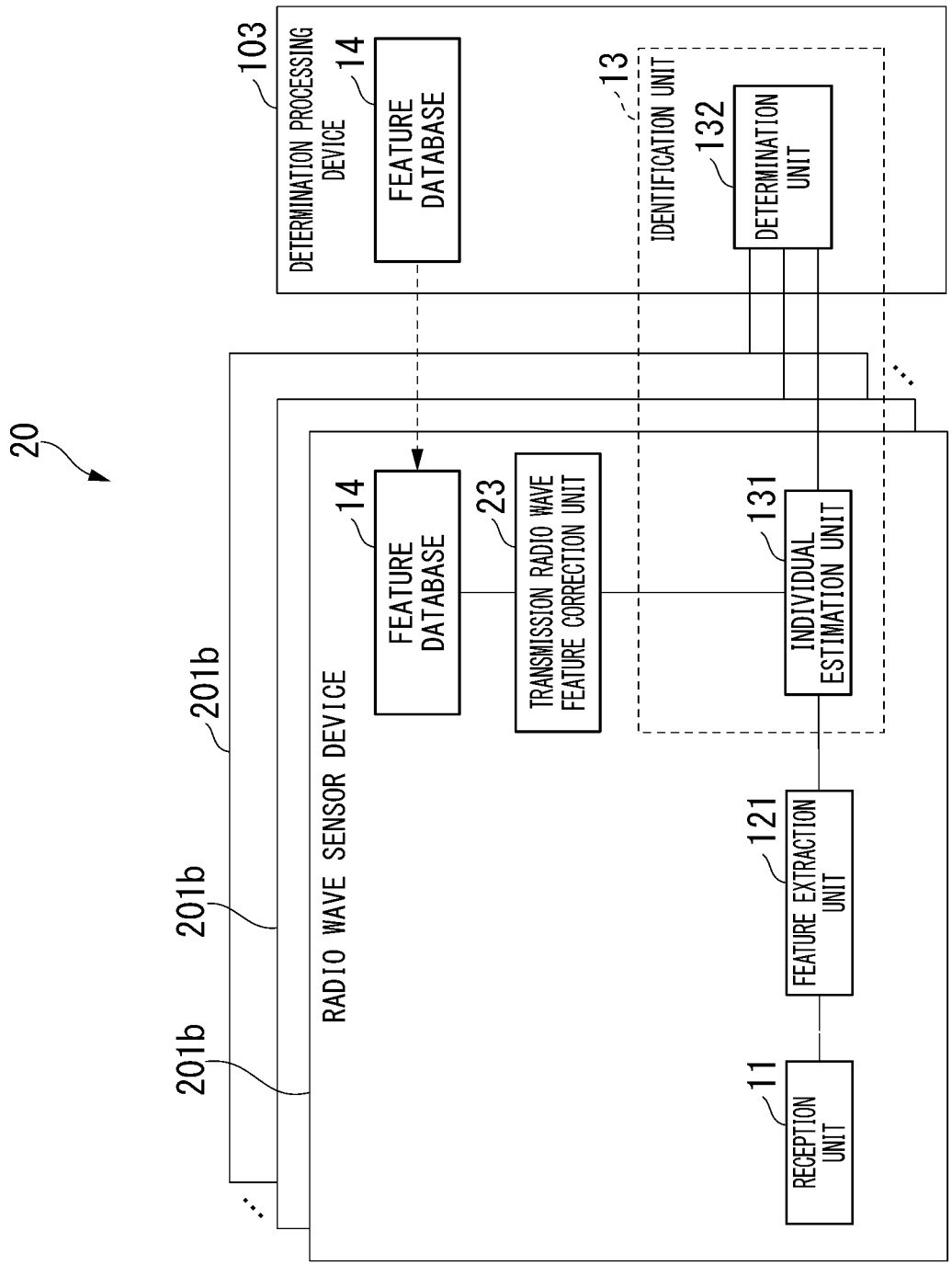
FIG. 18 is a schematic block diagram showing an example of a functional configuration of a transmission device identification system according to a ninth example embodiment.

FIG. 18 is a schematic block diagram showing an example of the functional configuration of the transmission device identification system according to the ninth example embodiment. In the configuration shown in FIG. 18, the transmission device identification system 20 is provided with a radio wave sensor device 201b and the determination processing device 103. The configuration shown in FIG. 18 differs from the case of FIG. 16 on the point of the transmission radio wave feature correction unit 23 and the individual estimation unit 131 being included in the radio wave sensor device 201b instead of the determination processing device 103, and the radio wave sensor device 201b including the feature database 14. In other respects, the radio wave sensor device 201b is similar to the radio wave sensor device 201a of FIG. 16, and the determination processing device 103 is similar to the identifying processing device 202a of FIG. 16. Further, the determination processing device 103 of FIG. 18 is similar to the determination processing device 103 of FIG. 9.

Accordingly, in the configuration shown in FIG. 18, the identification unit 13 includes the individual estimation unit 131 and the determination unit 132. The radio wave sensor device 201b includes the reception unit 11, the feature extraction unit 121, the transmission radio wave feature correction unit 23, the individual estimation unit 131 of the identification unit 13, and the feature database 14. The determination processing device 103 includes the determination unit 132 of the identification unit 13 and the feature database 14.

The number of radio wave sensor devices 201b included in the transmission device identification system 20 may be one or more. One reception unit 11 is mounted on one radio wave sensor device 201b. The feature extraction unit 121, the transmission radio wave feature correction unit 23, and the individual estimation unit 131 are provided for each reception unit 11.

The feature database 14 included in the determination processing device 103 is for distribution to each of the radio wave sensor devices 201b. The determination processing device 103 may have a configuration not including the feature database 14, such as a server device for distributing the feature database 14 being provided as a device separate from the determination processing device.

Figure 19:
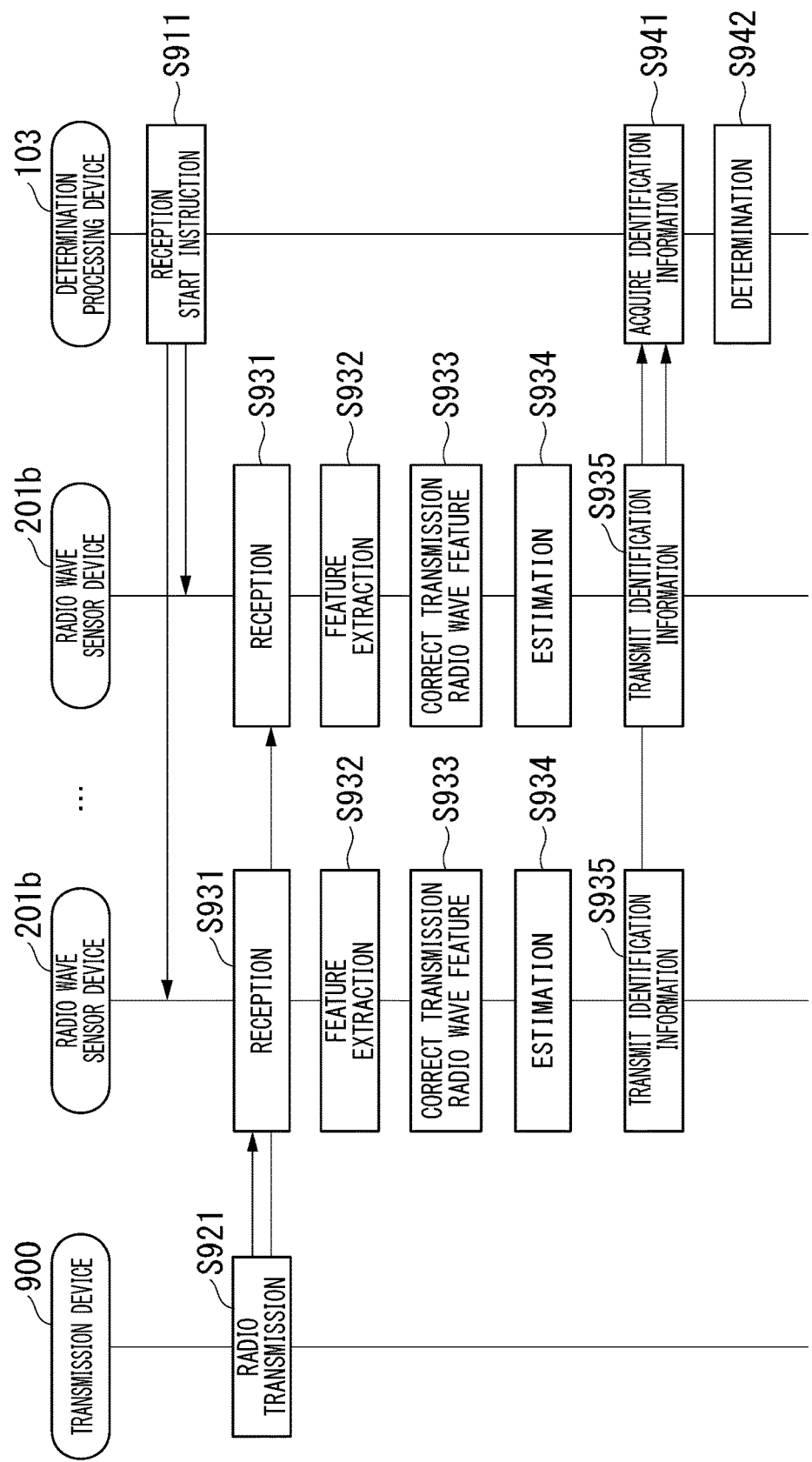
FIG. 19 is a sequence diagram showing a first example of the operation of the transmission device identification system according to the ninth example embodiment.

FIG. 19 is a sequence diagram showing a first example of the operation of the transmission device identification system 20 according to the ninth example embodiment.

The sequences S911 to S932 in FIG. 19 are similar to the sequences S811 to S832 in FIG. 17. After the sequence S932, the transmission radio wave feature correction unit 23 corrects the transmission radio wave feature (sequence S933). The individual estimation unit 131 estimates the transmission device 900 that is the radio wave transmitting source on the basis of the feature of the reception signal and the transmission radio wave feature after correction (sequence S934). Specifically, as described above, the individual estimation unit 131 compares the feature of the reception signal with the transmission radio wave feature for each transmission device 900, and estimates that the transmission radio wave feature determined to have the highest degree of similarity to the feature of the reception signal is the radio wave feature of the transmission device 900 that is a radio wave transmitting source.

The radio wave sensor device 201b transmits the identification information of the transmission device 900 estimated by the individual estimation unit 131 (identification information of the transmission radio wave feature) to the determination processing device 103 (sequence S935).

The determination processing device 103 receives the identification information transmitted by each of the radio wave sensor devices 201b that have received radio waves from the transmission device 900 (sequence S941). The determination unit 132 of the determination processing device 103 determines which of the transmission devices 900 identified by the identification information received by the determination processing device 103 is the transmission device 900 that is a radio wave transmitting source (sequence S942).

After the sequence S942, the transmission device identification system 20 ends the process of FIG. 19.

Figure 20:
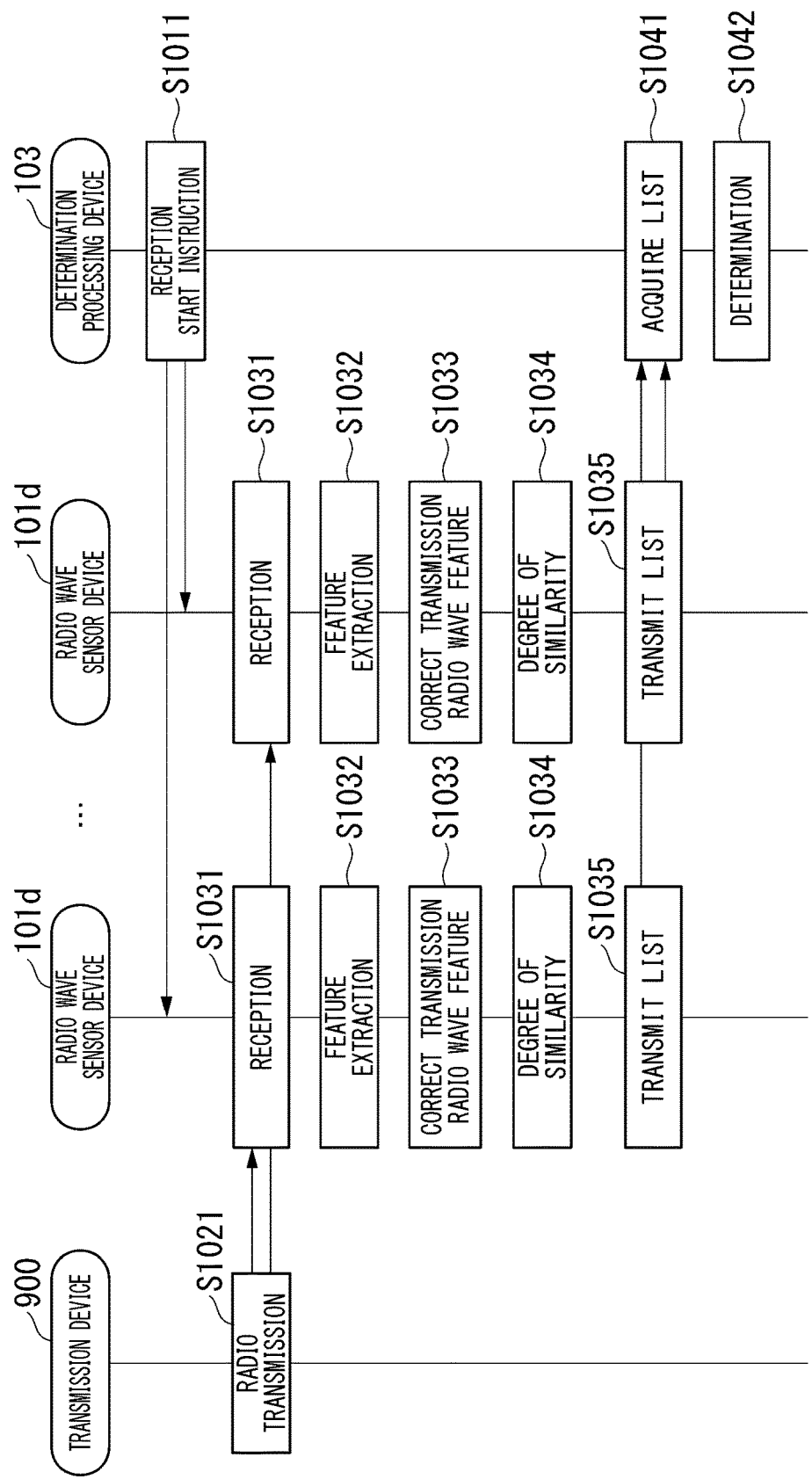
FIG. 20 is a sequence diagram showing a second example of the operation of the transmission device identification system according to the ninth example embodiment.

FIG. 20 is a sequence diagram showing a second example of the operation of the transmission device identification system 20 according to the ninth example embodiment.

The sequences S1011 to S1033 in FIG. 20 are similar to the sequences S911 to S933 in FIG. 19. After the sequence S1033, the individual estimation unit 131 computes the degree of similarity between the feature of the reception signal and the transmission radio wave feature for each transmission device 900 (each transmission radio wave feature stored by the feature database 14) on the basis of the feature of the reception signal and the corrected transmission radio wave feature (sequence S1034). The radio wave sensor device 201b transmits to the determination processing device 103 a list in which the identification information of the transmission device 900 (identification information of the transmission radio wave feature) is associated with the degree of similarity between the transmission radio wave feature of the transmission device 900 and the feature of the reception signal (sequence S1035).

The determination processing device 103 receives the list transmitted by each of the radio wave sensor devices 201b that have received radio waves from the transmission devices 900 (sequence S1041). The determination unit 132 of the determination processing device 103 determines which of the transmission devices 900 the transmission device 900 that is a radio wave transmitting source is, on the basis of the list received by the determination processing device 103 (sequence S1042).

After the sequence S1042, the transmission device identification system 20 ends the process of FIG. 20.

As described above, the individual estimation unit 131 estimates the transmission device 900 of the radio wave transmitting source for each one or more reception signals. The radio wave sensor device 201b includes the reception unit 11, the feature extraction unit 121, the transmission radio wave feature correction unit 23, and the individual estimation unit 131, and transmits to the identifying processing device 202b the identification information of the transmission device identified by the individual estimation unit 131 as the transmission device 900 that is the radio wave transmitting source. The determination unit 132 of the identifying processing device 202b determines which transmission device among the transmission devices identified by the identification information from the radio wave sensor device 201b is the transmission device that is a radio wave transmitting source.

Thereby, it is sufficient for the radio wave sensor device 201b to transmit the estimation result of the individual estimation unit 131 estimating the transmission device 900 that is the radio wave transmitting source to the determination processing device 103, and it is expected that the amount of communication can be reduced.

Regarding the transmission of a feature database (transmission of the transmission radio wave feature) from the determination processing device 103 to the radio wave sensor device 201b, the communication load can be relatively small by performing the transmission at a time when there is enough communication bandwidth.

Further, the determination unit 132 determines, by a majority vote of the identification information transmitted by the radio wave sensor device 201b, which of the transmission devices 900 identified by the identification information the transmitting device 900 that is a radio wave transmitting source is.

Thereby, the determination unit 132 can determine the transmission device 900 that is the radio wave transmitting source by a relatively simple process of taking a majority vote of the identification information, and in this respect, the load on the determination unit 132 can be reduced.

Further, the individual estimation unit 131 calculates the degree of certainty that, for each of the one or more transmission devices 900, that transmission device 900 is the transmission device of the radio wave transmitting source. The radio wave sensor device 201b, for each of the one or more transmission devices 900, transmits the identification information of the transmission device 900 and the degree of certainty calculated by the individual estimation unit 131 to the identifying processing device 202b. The determination unit 132 determines which of the transmission devices 900 identified by the identification information the transmission device 900 that is a radio wave transmitting source is, on the basis of the identification information and the degree of certainty from the radio wave sensor device 201b.

The determination unit 132 can determine the transmission device 900 that is the radio wave transmitting source with high accuracy in that the determination unit 132 determines the transmission device 900 that is the radio wave transmitting source using the degree of certainty calculated by the individual estimation unit 131.

Tenth Example Embodiment

In the tenth example embodiment, an example of the configuration of the radio wave sensor device will be described.

Figure 21:
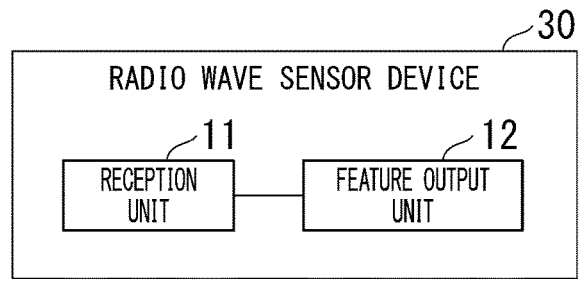
FIG. 21 is a diagram showing an example of a configuration of a radio wave sensor device according to a tenth example embodiment.

FIG. 21 is a diagram showing an example of the configuration of the radio wave sensor device according to the tenth example embodiment. A radio wave sensor device 30 shown in FIG. 21 is provided with the reception unit 11 and the feature output unit 12.

In such a configuration, the feature output unit 12 outputs the feature of the reception signal of the reception unit 11 corrected based on the receiver characteristic of the reception unit 11.

By identifying the transmission device 900 that is the radio wave transmitting source using the feature output by the radio wave sensor device 30, it is possible to reduce the influence of the receiver characteristic of the reception unit 11 on the identification of the transmission device 900 that is the radio wave transmitting source, and in this respect, it is possible to identify the transmission device 900 that is the radio wave transmitting source with high accuracy.

Eleventh Example Embodiment

In the eleventh example embodiment, another example of the configuration of the radio wave sensor device will be described.

Figure 22:
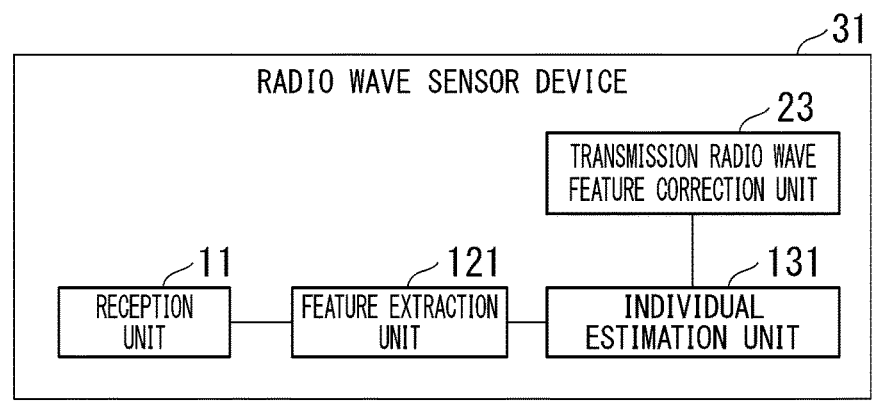
FIG. 22 is a diagram showing an example of a configuration of a radio wave sensor device according to an eleventh example embodiment.

FIG. 22 is a diagram showing an example of the configuration of the radio wave sensor device according to the eleventh example embodiment. A radio wave sensor device 31 shown in FIG. 22 includes the reception unit 11, the feature extraction unit 121, the transmission radio wave feature correction unit 23, and the individual estimation unit 131.

With such a configuration, the feature extraction unit 121 extracts the feature of the reception signal of the reception unit 11. The transmission radio wave feature correction unit 23 corrects the transmission radio wave feature indicating the feature of the transmission radio wave for each transmission device 900 based on the reception characteristic of the reception unit 11. The individual estimation unit 131 estimates the transmission device 900 of the radio wave transmitting source based on the feature of the reception signal of the reception unit 11 and the transmission radio wave feature after correction.

The individual estimation unit 131 uses the transmission radio wave feature corrected by the transmission radio wave feature correction unit 23, and thereby the influence of the receiver characteristic of the reception unit 11 on the feature of the reception signal of the reception unit 11 and the influence of the reception signal of the reception unit 11 on the transmission radio wave feature are offset. Thereby the influence of the receiver characteristic of the reception unit 11 on the estimation of the transmission device 900 that is the radio wave transmitting source performed by the individual estimation unit 131 is reduced. In this respect, the individual estimation unit 131 can estimate the transmission device 900 that is the radio wave transmitting source with high accuracy.

Twelfth Example Embodiment

In the twelfth example embodiment, an example of the configuration of the identifying processing device will be described.

Figure 23:
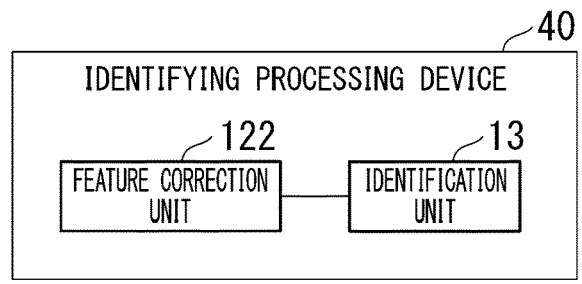
FIG. 23 is a diagram showing an example of a configuration of an identifying processing device according to a twelfth example embodiment.

FIG. 23 is a diagram showing an example of the configuration of the identifying processing device according to the twelfth example embodiment. An identifying processing device 40 shown in FIG. 23 includes the feature correction unit 122 and the identification unit 13.

In such a configuration, the feature correction unit 122, for each one or more reception units 11, corrects the feature of the reception signal of that reception unit 11 on the basis of the receiver characteristic of that reception unit 11. The identification unit 13 identifies the transmission device 900 that is the radio wave transmitting source on the basis of the feature of the reception signal after correction and the transmission radio wave feature indicating a feature of the transmission radio wave for each transmission device.

The identification unit 13 uses the feature of the reception signal corrected by the feature correction unit 122, and thereby it is possible to reduce the influence of the receiver characteristic of the reception unit 11 on the identification of the transmission device 900 that is the radio wave transmitting source. In this respect, the feature correction unit 122 can identify the transmission device 900 that is the radio wave transmitting source with high accuracy.

Thirteenth Example Embodiment

In the thirteenth example embodiment, another example of the configuration of the identifying processing device will be described.

Figure 24:
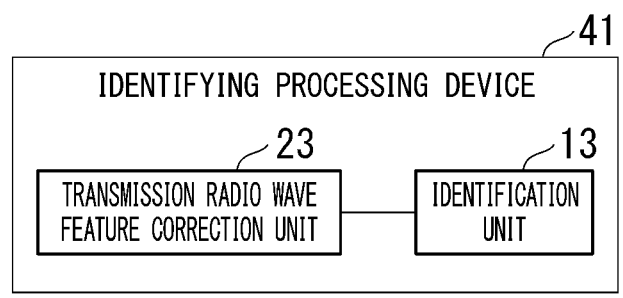
FIG. 24 is a diagram showing an example of a configuration of an identifying processing device according to a thirteenth example embodiment.

FIG. 24 is a diagram showing an example of the configuration of the identifying processing device according to the thirteenth example embodiment. An identifying processing device 41 shown in FIG. 24 includes the transmission radio wave feature correction unit 23 and the identification unit 13.

In such a configuration, the transmission radio wave feature correction unit 23 corrects the transmission radio wave feature indicating the feature of the transmission radio wave for each transmission device 900 on the basis of on the receiver characteristic of the reception unit 11 that receives the transmission radio wave. The identification unit 13 identifies the transmission device 900 that is a radio wave transmitting source on the basis of the feature of the reception signal for each one or more reception units 11 and the transmission radio wave feature after correction.

The identification unit 13 uses the transmission radio wave feature corrected by the transmission radio wave feature correction unit 23, and thereby when the feature of the reception signal and the transmission radio wave feature are compared, the influence of the receiver characteristic of the reception unit 11 is offset. In this respect, the feature correction unit 122 can identify the transmission device 900 that is a radio wave transmitting source with high accuracy.

Figure 25:
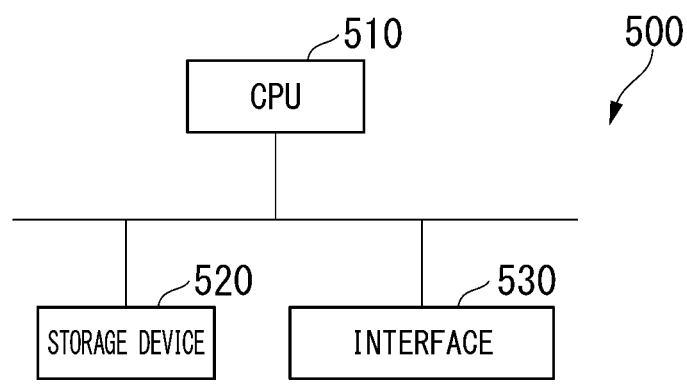
FIG. 25 is a schematic block diagram showing a configuration example of a computer according to at least one example embodiment.

FIG. 25 is a schematic block diagram showing a configuration example of a computer according to at least one example embodiment. In the configuration shown in FIG. 25, the computer 500 includes a CPU 510, a storage device 520, and an interface 530.

When any one or more of the above-mentioned radio wave sensor devices 101*a*, 101*b*, 101*c*, 101*d*, 101*e*, 201*a*, 201*b*, 30 and 31 are mounted on a computer, the operation of each of the above-mentioned processing units (all or some of the feature output unit 12, feature extraction unit 121, feature correction unit 122, reception signal correction unit 123, individual estimation unit 131 and transmission radio wave feature correction unit 23) is stored in the storage device 520 in the form of a program. The CPU 510 executes the processing of each processing unit by reading the program from the storage device 520 and executing it. The CPU 510 secures a storage area corresponding to each of the above-mentioned storage units (feature database 14) in the storage device 520 in accordance with the program. The function of the reception unit 11 is executed by the CPU 50 controlling a communication device as the interface 530 according to the program.

When any one or more of the above-mentioned identifying processing devices 102*a*, 102*c*, 202*a*, 40 and 41 are mounted on a computer, the operation of each of the above-mentioned processing units (all or some of the identification unit 13, individual estimation unit 131, determination unit 132, feature correction unit 122 and transmission radio wave feature correction unit 23) is stored in the storage device 520 in the form of a program. The CPU 510 executes the processing of each processing unit by reading the program from the storage device 520 and executing it. Further, the CPU 510 secures a storage area corresponding to each of the above-mentioned storage units (feature database 14) in the storage device 520 in accordance with the program.

When the above-mentioned determination processing device 103 is mounted on a computer, the operations of the above-mentioned processing units (determination unit 132) are stored in the storage device 520 in the form of a program. The CPU 510 executes the processing of each processing unit by reading the program from the storage device 520 and executing the program. Further, the CPU 510 secures a storage area corresponding to each of the above-mentioned storage units (feature amount database 14) in the storage device 520 according to the program.

A program for executing all or some of the processes performed by the radio wave sensor devices 101*a*, 101*b*, 101*c*, 101*d*, 101*e*, 201*a*, 201*b*, 30 and 31, the identifying processing devices 102*a*, 102*c*, 202*a*, 40 and 41, and the determination processing device 103 may be recorded on a computer-readable recording medium, and the program recorded on the recording medium may be read by a computer system and executed to perform the processing of each unit. The term "computer system" as used herein includes hardware such as an OS and peripheral devices.

Further, the "computer-readable recording medium" refers to a portable medium such as a flexible disk, a magneto-optical disk, a ROM, or a CD-ROM, or a storage device such as a hard disk built in a computer system. Further, the above-mentioned program may be a program for realizing some of the above-mentioned functions, and may be a program for realizing the above-mentioned functions in combination with a program already recorded in the computer system.

Although the example embodiments of the present invention have been described in detail with reference to the drawings, specific configurations are not limited to these example embodiments, and designs and the like within a range not deviating from the gist of the present invention are also included.

Some or all of the above example embodiments may also be described as, but not limited to, the following supplementary notes.

(Supplementary Note 1)

A transmission device identification system comprising:
one or more reception units;
a feature output unit that outputs, for each of the one or more reception units, a feature of a reception signal of the reception unit, the feature being corrected based on a receiver characteristic of the reception unit; and an identification unit that identifies a transmission device that is a radio wave transmitting source based on the feature and a transmission radio wave feature, the transmission radio wave feature indicating a feature of a transmission radio wave for each transmission device.

(Supplementary Note 2)

The transmission device identification system according to supplementary note 1, wherein the feature output unit comprises one or more feature output units respectively corresponding to the one or more reception units, and wherein each of the one or more feature output units comprises:

a feature extraction unit that extracts the feature of the reception signal of the reception unit; and a feature correction unit that corrects the feature based on the receiver characteristic of the reception unit.

(Supplementary Note 3)

The transmission device identification system according to supplementary note 2, comprising one or more radio wave sensor devices and an identifying processing device, wherein each of the one or more radio wave sensor devices comprises one of the one or more reception units and one of the one or more feature output units, and the identifying processing device comprises an identification unit.

(Supplementary Note 4)

The transmission device identification system according to supplementary note 2, comprising one or more radio wave sensor devices and an identifying processing device, wherein each of the one or more radio wave sensor devices comprises one of the one or more reception units and the feature extraction unit of one feature output unit of the one or more feature output units, and the identifying processing device comprises the feature correction unit of each of the one or more feature output units and the identification unit.

(Supplementary Note 5)

The transmission device identification system according to supplementary note 2, comprising one or more radio wave sensor devices and a determination processing device, wherein the identification unit comprises:

one or more individual estimation units that respectively correspond to the one or more reception units and estimate the transmission device that is the radio wave transmitting source for each reception signal of the corresponding reception unit; and a determination unit that determines which of the transmission device estimated by the individual estimation unit for each reception signal the transmission device that is the radio wave transmitting source is, each of the one or more radio wave transmission devices comprises one of the one or more reception units, one of the one or more feature output units, and one of the one or more individual estimation units; and the determination processing device comprises the determination unit.

(Supplementary Note 6)

The transmission device identification system according to supplementary note 5, wherein each of the one or more radio wave transmission devices transmits identification of the transmission device estimated by the individual estimation unit to the determination processing device, and the determination unit determines which of the transmission device identified by the identification information the transmission device that is the radio wave transmitting source is.

(Supplementary Note 7)

The transmission device identification system according to supplementary note 6, wherein the determination unit determines which of the transmission device identified by the identification information the transmission device that is the radio wave transmitting source is, by a majority vote of the identification information transmitted by each of the one or more radio wave sensor devices.

(Supplementary Note 8)

The transmission device identification system according to supplementary note 5, wherein each of the one or more individual estimation units calculates, for each of the one or more transmission devices, a degree of certainty that the transmission device is the transmission device that is the radio wave transmitting source, each of the one or more radio wave sensor devices, for each of the one or more transmission devices, transmits identification information of the transmission device and the degree of certainty to the determination processing device, and the determination unit determines which of the transmission devices identified by the identification information the transmission device that is the radio wave transmitting source is, based on the identification information and the degree of certainty.

(Supplementary Note 9)

The transmission device identification system according to any one of supplementary notes 2 to 8, wherein the feature correction unit of each of the one or more feature output units uses, as the receiver characteristic, one or more of a frequency characteristic, error vector amplitude, an IQ phase error, an IQ imbalance amount, frequency offset, and a symbol clock error of the reception unit.

(Supplementary Note 10)

The transmission device identification system according to supplementary note 1, wherein the feature output unit comprises one or more feature output units corresponding to one or more reception units, and the one or more feature output units comprises:

a reception signal correction unit that corrects the reception signal of the reception unit based on the receiver characteristic of the reception unit; and a feature extraction unit that extracts a feature of the corrected reception signal.

(Supplementary Note 11)

The transmission device identification system according to supplementary note 10, comprising one or more radio wave transmission devices and an identifying processing device, wherein each of the one or more radio wave transmission devices comprises one of the one or more reception units and one of the one or more feature output units, and the identifying processing device comprises the identification unit.

(Supplementary Note 12)

The transmission device identification system according to supplementary note 10, comprising one or more radio wave transmission devices and a determination processing device, wherein the identification unit comprises:

one or more individual estimation units that respectively correspond to the one or more reception units and estimate the transmission device that is the radio wave transmitting source for each reception signal of the corresponding reception unit; and a determination unit that determines which of the transmission device estimated for each reception signal by the one or more individual estimation units the transmission device that is the radio wave transmitting source is, wherein the one or more radio wave sensor devices comprises one of the one or more reception units, one of the one or more feature output units, and one of the one or more individual estimation units, and the determination processing device comprises the determination unit.

(Supplementary Note 13)

The transmission device identification system according to any one of supplementary notes 10 to 12, wherein the reception signal correction unit of each of the one or more feature output units uses, as the receiver characteristic, one or more of a frequency characteristic, error vector amplitude, an IQ phase error, an IQ imbalance amount, frequency offset, and a symbol clock error of the reception unit.

(Supplementary Note 14)

The transmission device identification system according to any one of supplementary notes 2 to 13, wherein the feature extraction unit of the one or more feature output units extracts the feature showing one or more of a transient, power spectral density of preamble portion, error vector amplitude, IQ phase error, IQ imbalance amount, frequency offset, and symbol clock error of the reception signal of the reception unit.

(Supplementary Note 15)

The transmission device identification system according to any one of supplementary notes 1 to 14, wherein the identification unit identifies the transmission device that is the radio wave transmitting source using one or more of a correlation degree calculation by cos similarity calculation, k-nearest neighbor method, random forest, support vector machine, and multi-layer perceptron.

(Supplementary Note 16)

A transmission device identification system comprising:
one or more reception units;
one or more feature extraction units that respectively correspond to the one or more reception units and extract a feature of a reception signal of the corresponding reception unit;
one or more transmission radio wave feature correction units that respectively correspond to the one or more reception units and correct a transmission radio wave feature based on a receiver characteristic of the corresponding reception unit, the transmission radio wave feature indicating a feature of a transmission radio wave for each transmission device; and
an identification unit that identifies a transmission device that is a radio wave transmitting source based on the feature and the corrected transmission radio wave feature.

(Supplementary Note 17)

The transmission device identification system according to supplementary note 16, comprising one or more radio wave sensor devices and an identifying processing device,
wherein each of the one or more radio wave sensor devices comprises one of the one or more reception units and one of the one or more feature extraction units, and
the identifying processing device comprises the one or more transmission radio wave feature correction units and the identification unit.

(Supplementary Note 18)

The transmission device identification system according to supplementary note 16, comprising one or more radio wave sensor devices and an identifying processing device,
wherein the identification unit comprises one or more individual estimation units that respectively correspond to the one or more reception units and estimate the transmission device that is the radio wave transmitting source for each reception signal,
each of the one or more radio wave sensor devices comprises one of the one or more reception units, one of the one or more feature extraction units, one of the one or more transmission radio wave feature correction units, and one of the one or more individual estimation units, and transmits identification information of the transmission device estimated by the individual estimation unit as the transmission device that is the radio wave transmitting source to the identifying processing device, and
the identifying processing device comprises a determination unit that determines which transmission device among the transmission device identified by the identification information is the transmission device that is the radio wave transmitting source.

(Supplementary Note 19)

The transmission device identification system according to supplementary note 18, wherein the determination unit determines which of the transmission device identified by the identification information the transmission device that is the radio wave transmitting source is, by a majority vote of the identification information transmitted by each of the one or more radio wave sensor devices.

(Supplementary Note 20)

The transmission device identification system according to supplementary note 18,
wherein each of the one or more individual estimation units calculates, for each of the one or more transmission devices, a degree of certainty that the transmission device is the transmission device that is the radio wave transmitting source,
each of the one or more radio wave sensor devices transmits, for each of the one or more transmission devices, identification information of the transmission device and the degree of certainty to the determination processing device, and
the determination unit determines which of the transmission device identified by the identification information the transmission device that is the radio wave transmitting source is, based on the identification information and the degree of certainty.

(Supplementary Note 21)

A radio wave sensor device comprising:
a reception unit; and
a feature output unit that outputs a feature of a reception signal of the reception unit, the feature being corrected based on a receiver characteristic of the reception unit.

(Supplementary Note 22)

The radio wave sensor device according to supplementary note 21,
wherein the feature output unit comprises:
a feature extraction unit that extracts the feature of the reception signal of the reception unit; and
a feature correction unit that corrects the feature based on the receiver characteristic of the reception unit.

(Supplementary Note 23)

The radio wave sensor device according to supplementary note 21,
wherein the feature output unit comprises:

a reception signal correction unit that corrects the reception signal of the reception unit based on the receiver characteristic of the reception unit; and a feature extraction unit that extracts a feature from the corrected reception signal.

(Supplementary Note 24)

A radio wave sensor device comprising:

a reception unit;

a feature extraction unit that extracts a feature of a reception signal of the reception unit;

a transmission radio wave feature correction unit that corrects a transmission radio wave feature based on a receiver characteristic of the reception unit, the transmission radio wave feature indicating a feature of a transmission radio wave for each transmission device; and an individual estimation unit that estimates a transmission device that is a radio wave transmitting source based on the feature and the corrected transmission radio wave feature.

(Supplementary Note 25)

An identifying processing device comprising:

a feature correction unit that corrects, for each of one or more reception units, a feature of a reception signal of the reception unit based on a receiver characteristic of the reception unit; and an identification unit that identifies a transmission device that is a radio wave transmitting source based on the corrected feature of the reception signal and a transmission radio wave feature showing a feature of a transmission radio wave for each transmission device.

(Supplementary Note 26)

A processing method comprising:

receiving a radio wave by one or more reception units;

outputting a feature of a reception signal of the reception unit, the feature being corrected based on a receiver characteristic of the reception unit; and identifying a transmission device that is a radio wave transmitting source based on the feature and a transmission radio wave feature, the transmission radio wave feature indicating a feature of a transmission radio wave for each transmission device.

(Supplementary Note 27)

A processing method comprising:

receiving a radio wave by a reception unit; and outputting a feature of a reception signal of the reception unit, the feature being corrected based on a receiver characteristic of the reception unit.

(Supplementary Note 28)

A processing method comprising:

receiving a radio wave by a reception unit;

extracting a feature of a reception signal of the reception unit;

correcting a transmission radio wave feature based on a receiver characteristic of the reception unit, the transmission radio wave feature indicating a feature of a transmission radio wave for each transmission device; and identifying a transmission device that is a radio wave transmitting source based on the feature and the corrected transmission radio wave feature.

(Supplementary Note 29)

A processing method comprising:

correcting, for each of one or more reception units, a feature of a reception signal of the reception unit based on a receiver characteristic of the reception unit; and identifying a transmission device that is a radio wave transmitting source based on the corrected feature of the reception signal and a transmission radio wave feature, the transmission radio wave feature indicating a feature of a transmission radio wave for each transmission device.

(Supplementary Note 30)

A processing method comprising:

correcting a transmission radio wave feature based on a receiver characteristic of a reception unit, the transmission radio wave feature indicating a feature of a transmission radio wave for each transmission device, the reception unit receiving the transmission radio wave; and identifying a transmission device that is a radio wave transmitting source based on a feature of a reception signal for each of one or more reception units and the corrected transmission radio wave feature.

(Supplementary Note 31)

A recording medium that stores a program for causing a computer to execute:

receiving a radio wave by a reception unit; and outputting a feature of a reception signal of the reception unit, the feature being corrected based on a receiver characteristic of the reception unit.

(Supplementary Note 32)

A recording medium that stores a program for causing a computer to execute:

receiving a radio wave by a reception unit;

extracting a feature of a reception signal of the reception unit;

correcting a transmission radio wave feature based on a receiver characteristic of the reception unit, the transmission radio wave feature indicating a feature of a transmission radio wave for each transmission device; and identifying a transmission device that is a radio wave transmitting source based on the feature and the corrected transmission radio wave feature.

(Supplementary Note 33)

A recording medium that stores a program for causing a computer to execute:

correcting, for each of one or more reception units, a feature of a reception signal of the reception unit based on a receiver characteristic of the reception unit; and identifying a transmission device that is a radio wave transmitting source based on the corrected feature of the reception signal and a transmission radio wave feature, the transmission radio wave feature indicating a feature of a transmission radio wave for each transmission device.

(Supplementary Note 34)

A recording medium that stores a program for causing a computer to execute:

correcting a transmission radio wave feature based on a receiver characteristic of a reception unit, the transmission radio wave feature indicating a feature of a transmission radio wave for each transmission device, the reception unit receiving the transmission radio wave; and identifying a transmission device that is a radio wave transmitting source based on a feature of a reception signal for each of one or more reception units and the corrected transmission radio wave feature.

This application is based upon and claims the benefit of priority from Japanese Patent Application No. 2018-112197, filed Jun. 12, 2018, the disclosure of which is incorporated herein in its entirety.

INDUSTRIAL APPLICABILITY

The present invention may be applied to a transmission device identification system, a radio wave sensor device, an identifying processing device, a processing method, and a recording medium.

REFERENCE SYMBOLS 10, 20: Transmission device identification system
11: Reception unit
12: Feature output unit
13: Identification unit
14: Feature database
20: Transmission device identification system
23: Transmission radio wave feature correction unit
101a, 101b, 101c, 101d, 101e, 201a, 201b, 30, 31: Radio wave sensor device
102a, 102c, 202a, 40, 41: Identifying processing device
103: Determination processing device
121: Feature extraction unit
122: Feature correction unit
123: Reception signal correction unit
131: Individual estimation unit
132: Determination unit

What is claimed is:

1. A transmission device identification system comprising:
a plurality of receivers that receive a reception signal;
a feature output unit that outputs a plurality of features of the reception signal that respectively correspond to the plurality of receivers, each of the plurality of features being corrected based on a receiver characteristic of a corresponding receiver; and
an identification unit that identifies a transmission device that is a radio wave transmitting source based on the plurality of features of the reception signal and a transmission radio wave feature, the transmission radio wave feature indicating a feature of a transmission radio wave for the transmission device.

2. The transmission device identification system according to claim 1,
wherein the feature output unit comprises a plurality of feature output units respectively corresponding to the plurality of receivers, and
wherein each of the plurality of feature output units comprises:
a feature extraction unit that extracts a corresponding feature of the reception signal of the corresponding receiver; and
a feature correction unit that corrects the corresponding feature based on the receiver characteristic of the corresponding receiver.

3. The transmission device identification system according to claim 2, comprising a plurality of radio wave sensor devices and an identifying processing device,
wherein each of the plurality of radio wave sensor devices comprises one of the plurality of receivers and one of the plurality of feature output units, and
the identifying processing device comprises an identification unit.

4. The transmission device identification system according to claim 2, comprising plurality of radio wave sensor devices and an identifying processing device,
wherein each of the plurality of radio wave sensor devices comprises one of the plurality of receivers and the feature extraction unit of one of the plurality of feature output units, and
the identifying processing device comprises the feature correction unit of each of the plurality of feature output units and the identification unit.

5. The transmission device identification system according to claim 2, comprising a plurality of radio wave sensor devices and a determination processing device,
wherein the identification unit comprises:
a plurality of individual estimation units that respectively correspond to the plurality of receivers and estimate the transmission device that is the radio wave transmitting source for each reception signal of the corresponding receiver; and
a determination unit that determines which of the transmission device estimated by the individual estimation unit for each reception signal the transmission device that is the radio wave transmitting source is,
each of the plurality of radio wave sensor devices comprises one of the plurality of receivers, one of the plurality of feature output units, and one of the plurality of individual estimation units; and
the determination processing device comprises the determination unit.

6. The transmission device identification system according to claim 5,
wherein each of the plurality of radio wave sensor devices transmits identification information of the transmission device estimated by the individual estimation unit to the determination processing device, and
the determination unit determines which of the transmission device identified by the identification information the transmission device that is the radio wave transmitting source is.

7. The transmission device identification system according to claim 6, wherein the determination unit determines which of the transmission device identified by the identification information the transmission device that is the radio wave transmitting source is, by a majority vote of the identification information transmitted by each of the plurality of radio wave sensor devices.

8. The transmission device identification system according to claim 5,
wherein the transmission device is one of one or more transmission devices,
each of the plurality of individual estimation units calculates, for each of the one or more transmission devices, a degree of certainty that the transmission device is the radio wave transmitting source,
each of the plurality of radio wave sensor devices, for each of the one or more transmission devices, transmits identification information of the transmission device and the degree of certainty to the determination processing device, and
the determination unit determines which of the transmission devices identified by the identification information the transmission device that is the radio wave transmitting source is, based on the identification information and the degree of certainty.

9. The transmission device identification system according to claim 2, wherein the feature correction unit of each of the plurality of feature output units uses, as the receiver characteristic, one or more of a frequency characteristic, an error vector amplitude, an IQ phase error, an IQ imbalance amount, a frequency offset, and a symbol clock error of the corresponding receiver.

10. The transmission device identification system according to claim 2, wherein the feature extraction unit of each of the plurality of feature output units extracts the feature showing one or more of a transient, a power spectral density of a preamble portion, an error vector amplitude, an IQ phase error, an IQ imbalance amount, a frequency offset, and symbol clock error of the reception signal of the corresponding receiver.

11. The transmission device identification system according to claim 1,
wherein the feature output unit comprises plurality of feature output units respectively corresponding to the plurality of receivers, and
each of the plurality of feature output units comprises:
a reception signal correction unit that corrects the reception signal of the corresponding receiver based on the receiver characteristic of the corresponding receiver; and
a feature extraction unit that extracts a feature of the corrected reception signal.

12. The transmission device identification system according to claim 11, comprising a plurality of radio wave sensor devices and an identifying processing device,
wherein each of the plurality of radio wave sensor devices comprises one of the plurality of receivers and one of the plurality of feature output units, and
the identifying processing device comprises the identification unit.

13. The transmission device identification system according to claim 11, comprising a plurality of radio wave sensor devices and a determination processing device,
wherein the identification unit comprises:
a plurality of individual estimation units that respectively correspond to the plurality of receivers and estimate the transmission device that is the radio wave transmitting source for each reception signal of the corresponding receiver; and
a determination unit that determines which of the transmission device estimated for each reception signal by the plurality of individual estimation units the transmission device that is the radio wave transmitting source is,
wherein each of the plurality of radio wave sensor devices comprises one of the plurality of receivers, one of the plurality of feature output units, and one of the plurality of individual estimation units, and
the determination processing device comprises the determination unit.

14. The transmission device identification system according to claim 11, wherein the reception signal correction unit of each of the plurality of feature output units uses, as the receiver characteristic, one or more of a frequency characteristic, an error vector amplitude, an IQ phase error, an IQ imbalance amount, a frequency offset, and a symbol clock error of the corresponding receiver.

15. The transmission device identification system according to claim 1, wherein the identification unit identifies the transmission device that is the radio wave transmitting source using one or more of a correlation degree calculation by cos similarity calculation, k-nearest neighbor method, random forest, support vector machine, and multi-layer perceptron.

16. A transmission device identification system comprising:
one or more receivers;
one or more feature extraction units that respectively correspond to the one or more receivers and extract a feature of a reception signal of a corresponding receiver;
one or more transmission radio wave feature correction units that respectively correspond to the one or more receivers and correct a transmission radio wave feature based on a receiver characteristic of the corresponding receiver, the transmission radio wave feature indicating a feature of a transmission radio wave for each of a plurality of transmission devices; and
an identification unit that identifies the transmission device that is a radio wave transmitting source based on the feature of the reception signal and the corrected transmission radio wave feature.

17. The transmission device identification system according to claim 16, comprising one or more radio wave sensor devices and an identifying processing device,
wherein each of the one or more radio wave sensor devices comprises one of the one or more receivers and one of the one or more feature extraction units, and
the identifying processing device comprises the one or more transmission radio wave feature correction units and the identification unit.

18. The transmission device identification system according to claim 16, comprising one or more radio wave sensor devices and an identifying processing device,
wherein the identification unit comprises one or more individual estimation units that respectively correspond to the one or more receivers and estimate the transmission device that is the radio wave transmitting source for each reception signal,
each of the one or more radio wave sensor devices comprises one of the one or more receivers, one of the one or more feature extraction units, one of the one or more transmission radio wave feature correction units, and one of the one or more individual estimation units, and transmits identification information of the transmission device estimated by the individual estimation unit as the transmission device that is the radio wave transmitting source to the identifying processing device, and
the identifying processing device comprises a determination unit that determines which transmission device among the transmission device identified by the identification information is the transmission device that is the radio wave transmitting source.

19. An identifying processing method comprising:
receiving, by a plurality of receivers, a reception signal;
outputting a plurality of features of the reception signal that respectively correspond to the plurality of receivers, each of the plurality of features being corrected based on a receiver characteristic of a corresponding receiver; and
identifying a transmission device as a transmitting source of the reception signal based on the plurality of features of the reception signal and a pre-registered feature of a transmission radio wave of one or more transmission devices.

20. An identifying processing method comprising:
extracting, for each of one or more receivers, a feature from a reception signal received by the receiver;
correcting, for each of the one or more receivers, a pre-registered feature of a transmission radio wave of one or more transmission devices based on a receiver characteristic of the receiver; and
identifying a transmission device as a transmitting source of the reception signal based on the feature of the reception signal and the corrected feature of the transmission radio wave.

* * * * *